US012776912B2

(12) United States Patent
Cardenes Cabre et al.

(10) Patent No.: US 12,776,912 B2
(45) Date of Patent: Oct. 27, 2026

(54) PRIVACY-PRESERVING CREDENTIALING AND PAYMENT

(71) Applicant: Via Science, Inc., Somerville, MA (US)

(72) Inventors: Jesus Alejandro Cardenes Cabre, Montreal (CA); Madjid Aoudia, Rennes (FR); Jeremy Taylor, Odense (DK); Pourya Fazli, Montreal (CA); Arteum Kanda, Montreal (CA)

(73) Assignee: Via Science, Inc., Somerville, MA (US)

( * ) Notice: Subject to any disclaimer, the term of this patent is extended or adjusted under 35 U.S.C. 154(b) by 0 days.

(21) Appl. No.: 19/569,590

(22) Filed: Mar. 17, 2026

(65) Prior Publication Data

US 2026/0291741 A1 Sep. 24, 2026

Related U.S. Application Data

(60) Provisional application No. 63/848,638, filed on Jul. 22, 2025, provisional application No. 63/773,772, filed on Mar. 18, 2025.

(51) Int. Cl.
*H04L 9/32* (2006.01)
*H04L 9/08* (2006.01)

(52) U.S. Cl.
CPC .......... *H04L 9/3231* (2013.01); *H04L 9/0825* (2013.01); *H04L 9/3213* (2013.01)

(58) Field of Classification Search
CPC .... H04L 9/3231; H04L 9/0825; H04L 9/3213
See application file for complete search history.

(56) References Cited

U.S. PATENT DOCUMENTS 10,764,752 B1 * 9/2020 Avetisov ............. H04L 63/0823
2019/0164156 A1 5/2019 Lindemann
(Continued)

FOREIGN PATENT DOCUMENTS

WO 2021016311 A1 1/2021
WO 2022026377 A1 2/2022

OTHER PUBLICATIONS

Notification of Transmittal of the International Search Report and the Written Opinion of the International Searching Authority, for International Patent Application No. PCT/US2026/019531, mailed on May 12, 2026, 13 pages.
(Continued)

*Primary Examiner* — Bryan Y Lee
(74) *Attorney, Agent, or Firm* — Pierce Atwood LLP

(57) ABSTRACT

A system may be configured to allow a user to authenticate themselves with a system and/or make digital payments using digital credentials. The digital credentials may allow the user to control their own identification and prove their identity and/or attributes to approved parties while maintaining privacy. Using cryptographic techniques, an approved party may verify the user's digital credentials even in absence of a network connection, allowing the parties to operate when network connectivity is intermittent, unreliable, or otherwise limited. A digital credential may be linked to a particular biometric identification to secure the digital credential to the user and their personal electronic device. In some implementations, the user may obtain a secondary digital credential that is not linked to a particular biometric template. If the primary digital credential is unavailable, the secondary digital credential may allow the user to authenticate themselves on a temporary or limited basis.

20 Claims, 15 Drawing Sheets

(56) References Cited

U.S. PATENT DOCUMENTS

| | | | | |
|---|---|---|---|---|
| 2023/0344649 | A1* | 10/2023 | Zamani | G06Q 20/3227 |
| 2025/0021982 | A1* | 1/2025 | Devaraj | G06Q 20/4016 |

OTHER PUBLICATIONS

Lesavre, L., et al. "A Taxonomic Approach to Understanding Emerging Blockchain Identity Management Systems." NIST National Institute of Standards and Technology (2020), 62 pages.

* cited by examiner

PRIVACY-PRESERVING CREDENTIALING AND PAYMENT

CROSS-REFERENCE TO RELATED APPLICATION

This application claims the benefit of priority of U.S. Provisional Patent Application No. 63/773,772, filed Mar. 18, 2025, and entitled "Method and System for Verifying Execution Integrity on a Mobile Device Using Dynamic Challenges, Trusted Execution Environment, and Verifiable Zero-Knowledge Proofs," and of U.S. Provisional Patent Application No. 63/848,638, filed Jul. 22, 2025, and entitled "Privacy-Preserving Authentication System," the contents of which are incorporated herein by reference in their entirety.

BRIEF DESCRIPTION OF DRAWINGS

For a more complete understanding of the present disclosure, reference is now made to the following description taken in conjunction with the accompanying drawings.

DETAILED DESCRIPTION

Figure 1A:
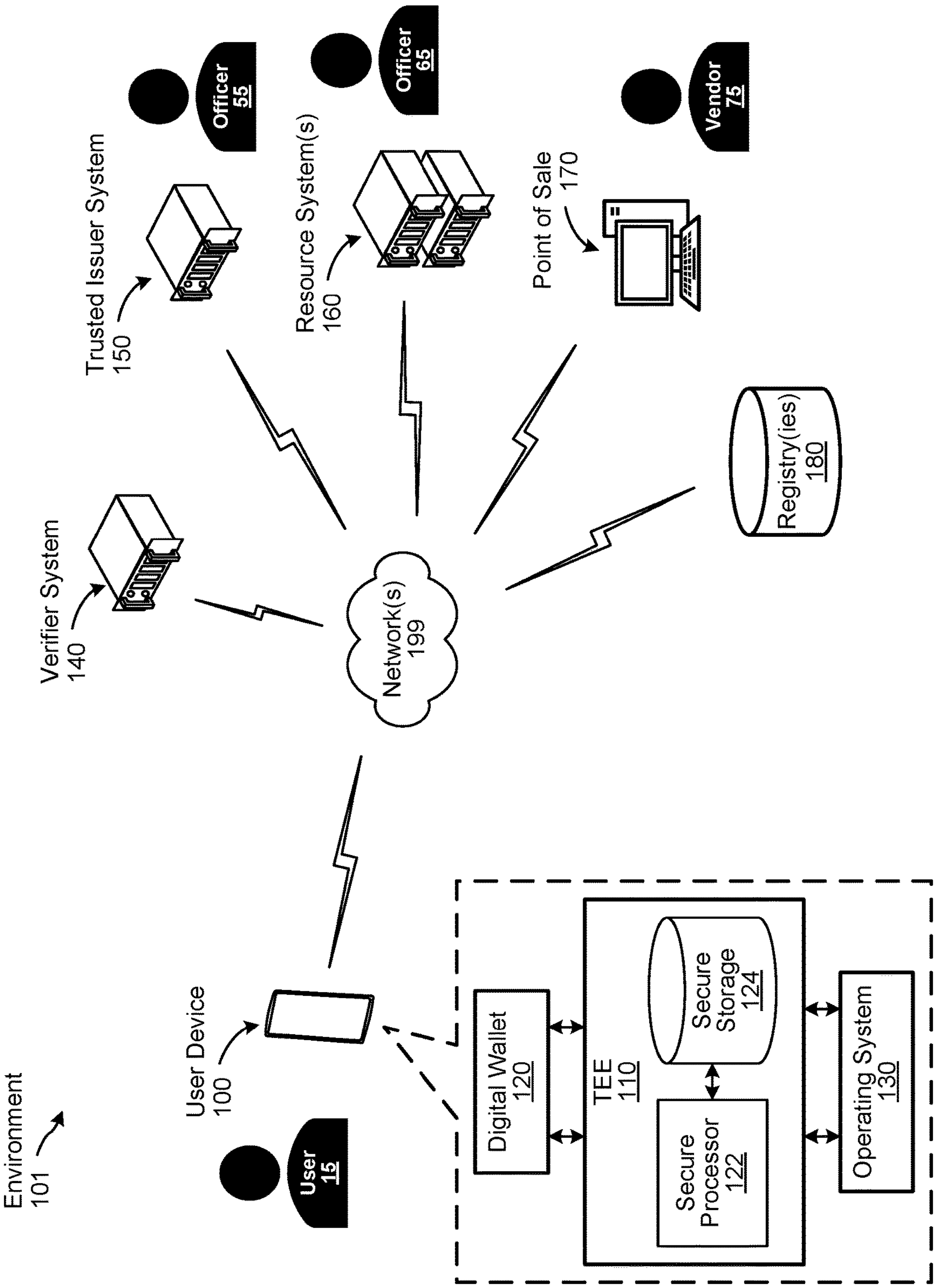
FIG. 1A illustrates an example environment in which a system enables privacy-preserving credentialing and payment, according to embodiments of the present disclosure.

Personal electronic devices can allow users to establish their identity and execute transactions based on their unique phone number and other hardware or software identifiers corresponding to the device. For example, a user may authenticate themselves using a verification code or link sent via email or text message, withdraw money from an automatic teller machine (ATM) using a banking app, make purchases using a stored credit card, and so on. Such uses require one or both parties to have an online network connection so that the user can receive the verification code/link, the ATM can verify the user's balance, the merchant can verify the credit card, etc.

Offered herein are systems and methods for authentication and payments in environments where network connectivity is intermittent, unreliable, or otherwise limited. Such environments are referred to as denied, degraded, intermittent, and limited (DDIL). DDIL environments pose challenges for electronic transactions that traditionally require real-time network connectivity for verifying identities, attributes, financial accounts, balances, etc. If authentication or verification is required when network connectivity is unavailable, the parties may have to suspend or cancel the transaction until connections are restored. If authentication or verification is waived or delayed, the security of one or both parties may be compromised.

The system may allow for secure authentication and payments in DIDL environments using digital credentials, also known as verifiable credentials (VCs), signed using cryptographic keys stored in a trusted execution environment (TEE) of a party's pre-registered personal electronic device. A TEE is a separate and secure processor, or area of the main processor, of a personal electronic device. In some cases, a TEE may have dedicated memory and/or storage protected by hardware-based encryption. A TEE protects the integrity and confidentiality of code and data loaded into the TEE. Code and data loaded into the TEE cannot be read, modified, or replaced by unauthorized entities. TEEs can be further hardened against duplication or simulation using a hardware root of trust such as embedding private keys directly into the silicon during manufacturing such that the keys cannot be changed by software means. Examples of TEEs are Secure Enclave offered by Apple Inc of Cupertino, CA, and Trust offered by Google LLC of Mountain View, CA.

A digital credential such as a VC is a digital document that can contain information corresponding to the holder such as an identity or attribute. The information can represent a tangible credential such as a government-issued identification or an intangible attribute such as bank account. VCs operate in a triangle of trust between three parties: a trusted issuer, a holder, and a verifier. The holder may obtain a VC from the issuer and use the VC to prove a fact to the verifier; for example, the holder's identity, age, employment, etc. In the triangle of trust the issuer trusts the holder, the holder trusts the verifier, and the verifier trusts the issuer.

The use of VCs relies on cryptographic techniques such as digital signatures to make the VCs resistant to tampering or copying. For example, the trusted issuer may digitally sign a VC with their private key so that other parties can verify the provenance of the VC using the trusted issuer's public key. Similarly, the holder may digitally sign the VC using their own private key to generate a verifiable presentation (VP) for presentation to a verifier. If the holder's corresponding public key is in the VC, which has been signed by the trusted issuer, the holder can use the VP to prove to a verifier that the holder has established their identity/attributes with the trusted issuer. In other words, the verifier may use the trusted issuer's public key to verify that the trusted issuer signed the VC, and the public key in the VC to verify that the party who signed the VP is the proper holder of the VC.

A holder of a VC, also referred to herein as a "user," may obtain a VC by providing physical documents to an authorized individual such as an officer of a government or organization. Upon verifying the user's documents, the officer may use the system to issue a VC to the user. Typically, the system will issue the VC to the user's personal electronic device, also referred to herein as a "user device." The user may store the VC in the device, and use the TEE to apply a digital signature to the VC to generate a VP.

A digital wallet application is a software component such as an app that executes on the processor or processors of a personal electronic device. In some cases, a digital wallet application may be capable of performing certain limited operations using the device's TEE. For example, the digital wallet application may allow the user to generate cryptographic keys in the TEE, and use the TEE to sign VCs using the cryptographic keys to generate VPs, subject to policies and permissions dictated by the VCs and/or enforced by the TEE. For example, the TEE may require the user to authenticate themselves prior to using a cryptographic key stored in the TEE.

Using the TEE to digitally sign VCs provides additional layers of security. In addition to the protection offered by the secure storage and private keys, the system can use the TEE to enforce policies regarding the use of cryptographic keys. For example, for purposes of issuing a VC to the user, the trusted issuer system can request a cryptographic key that is linked to a biometric identification, such as a fingerprint or facial scan. The TEE may condition use of a biometric-linked cryptographic key on a biometric authentication; that is, the TEE may require the user to provide a biometric input that matches a biometric template created when the user enrolled their biometric identification with the user device. The biometric-linked cryptographic key pair may include a public key and a private key. The TEE may securely store the private key such that it does not leave the TEE, and any use of the private key is conditioned on the user authenticating their biometric identification. The public key may be sent to the trusted issuer system along with an indication from the TEE that the corresponding private key is linked to a particular biometric template. The trusted issuer system may create a VC that includes the public key, and return it to the user device. Before digitally signing the VC using the corresponding public key, the TEE may prompt the user to provide a biometric input that matches the biometric template. The TEE may be designed and/or configured to delete keys associated with an old biometric template if a new biometric template is registered. In this manner, the TEE can prevent another user from using the private key, and thus the VC. If someone obtained the VC and attempted to use it from another device, they would be unable to sign the VC with the proper private key. Moreover, if the user or someone else registers a new biometric identification on the device, the act would delete the private key. Thus, if a user is able to provide a VP based on a VC subject to these added protections, a verifier may trust that the user is who they say they are, even if one or both of the user or verifier lacks a live network connection at that time.

In some cases, however, a user may have to change their biometric identification. For example, an abrasion or adhesive may alter their fingerprint to the extent that it no longer matches the biometric template. Similarly, facial recognition may struggle if the camera or scanner's optics are dirty/damaged, or a user's features change due to, for example, makeup, accessories (e.g., jewelry or glasses), illness or injury, wearing a medical mask, etc. Thus, in some implementations, a trusted issuer may provide a user with a secondary, or backup, VC. The issuer may issue the primary VC for a first public key, where the TEE has indicated that the corresponding private key is linked to a specific biometric template. The primary VC may correspond to broad permissions; for example, the user may use this VC to establish their identity, gain access to a restricted information technology (IT) system, execute a financial transaction, etc., for as long as the primary VC remains valid. The issuer may issue the secondary VC for a second public key, where the corresponding private key is not linked to a particular biometric template. The user device may allow use of this second private key based on one or more alternative means of unlocking/accessing the device (e.g., other than the biometric identification linked to the primary VC). For example, in some cases, the user device may allow use of the second private key subject to biometric identification, even if the user enrolls a new biometric identification and replaces the previous biometric template with a new one. In some cases, the user device may allow the user to authenticate themselves using a password and/or personal identification number (PIN). In some cases, the second private key may be stored outside of the TEE, which may allow the user to transfer the secondary VC to another device. The secondary VC may correspond to a narrower set of permissions. For example, rather than permitting the same level of authorization/access as the primary VC, the user may use the secondary VC to electronically register (e.g., without having to produce physical documents in a particular location) to obtain temporary authorization/access by way of a temporary VC that may grant the user access a system for a limited time, execute limited number of financial transactions, or execute transactions for a limited total amount. This may allow the user the ability to travel to a new location, establish their identity, access their accounts, and/or perform their duties without having to reregister by presenting physical documents to an official, even if they have had to change their biometric identification or personal electronic device. The user may request a temporary VC by digitally signing the secondary VC using the second private key to generate a VP. The system may verify the VP by determining that the digital signature matches the second public key in the VC. In some implementations, the system can verify user requests for a temporary VC by checking a registry to determine whether the user's credentials are still valid (e.g., to prevent the user or someone else from using the secondary VC to circumvent a revoked primary VC).

In some implementations, the system may provide for a manner of privacy-preserving authentication of a user. For example, in some cases, the system may allow the user to selectively disclose the possession of a VC, or a certain attribute recorded in the VC, without revealing their identity or unnecessary personal information. A VC may attest to various attributes of the user such as identity, age, title within an organization, etc. The issuer may sign each attribute separately, such that the user can share a single attribute without divulging the others. For example, in the case of a government- or state-issued credential, the user may wish to share their identity but not their address, or prove that they're over 18 without revealing their legal name. In some implementations, the system may use decentralized identity (DID) technology and zero-knowledge proofs (ZKPs) to allow a user to demonstrate possession of a VC. In this way, the user may establish themselves as verified but anonymous for purposes of accessing a resource, engaging in a financial transaction, or the like.

In some cases, the system may allow the user to use their digital wallet application to demonstrate possessions of a credential without revealing the actual credential, password, or personal information. The digital wallet may generate a VP using the VC and a ZKP. For example, in some implementations, the digital credentials may include a salted hash of a password and/or other secret information. The digital wallet may regenerate the salted hash using the known password and the salt, providing knowledge of the hash for authentication without revealing the actual password. In some implementations, the digital wallet may create a cryptographic key pair and send a key to the trusted issuer for signing a hash of the secret information (e.g., a password, VC, or other sensitive data).

A relying party such as a local agency or vendor may validate the VP themselves or with the aid of a verifier system or service. The VP may be validated against the trusted issuer's public keys (e.g., obtained from a decentralized registry). Upon verification of the VP, the verifier service may authorize access to the requested resource. In some implementations, the system may use authentication tokens for compatibility with existing systems using hypertext transfer protocol secure (HTTPS). For example, the system may create a delegated authentication token and send it to the resource. The token may allow the resource to authorize and track the user's access to the resource for a period of time. In some cases, the token may include a public anonymous identifier generated by the digital wallet application and/or assigned to the user by the system. The token and anonymous identifier may allow the user to revisit the resource and continue a previous session without repeating the authentication process and without uniquely identifying themselves.

In this manner, the system may leverage the benefits of DID technology and ZKP to provide a secure and privacy-preserving method for user authentication. On the client side, a user may selectively disclose credentials to access a resource without revealing sensitive personal information. On the resource side, a service provider may be assured of the user's identity and/or attributes without receiving passwords or other personal data.

In some implementations, the system may maintain an "allowlist" of valid VCs. To increase security, the system may implement a policy of granting a single primary VC to an individual. When a user attempts to access a resource or execute a transaction, the system may check their VC against the allowlist. For example, the system may store a hash of the VC in a registry. Upon receiving a VP with a request for access to a resource, the system may determine a hash from the information in the VP, and check it against the VC hashes in the allowlist. The system may include user management features that allow it to remove a VC hash from the allowlist when access for the VC is to be revoked. The system may remove a user and/or their VC from the allowlist for various reasons; for example, because the user notifies the issuer that they have lost their VC, that they have changed their biometric identification and registered a new VC, and/or because the system detects suspicious activity related to the user and/or their VC. Implementing an allowlist in this manner may improve security over allowing "dangling permissions" resulting from obsolete or duplicate but still valid VCs. An allowlist may also be more secure than the converse blocklist that lists VCs the system has revoked, but which may not include all VCs that the system should no longer recognize.

The systems and methods described herein may apply to various use cases. The use cases and their steps are described in a particular order, but the steps may be performed in various orders without departing from the scope of the disclosure. In a first use case, the user is a member of a non-governmental organization (NGO). The user may visit the headquarter office of the organization to register their identification using their mobile phone and physical identification documents. A registration officer of the organization may verify the user's documents and identity. The user may use the digital wallet application on their mobile phone to generate a decentralized identifier (e.g., a cryptographic key pair). In some cases, the officer may instruct the user to configure the TEE of their mobile phone to enforce biometric verification of the user's key pair. In some implementations, the user device may be managed by the organization to enforce certain security protections, such as mandatory linking of cryptographic keys generated in the TEE to biometric identification. The officer uses their official private key to digitally sign the user's identity within the organization ecosystem, and provide the user's digital wallet with a VC. The organization may use secure cryptographic algorithms to protect the user's identity from identity thieves and/or state-level actors. For example, the organization's digital signatures and encryption may employ quantum-resistant (e.g., post-quantum) cryptographic algorithms such as those of the Commercial National Security Algorithm Suite (CNSA) 2.0 promulgated by the National Security Agency. The user registers a biometric identification to be linked to the VC. The user uses their digital wallet to accept the VC and link it to the biometric template for the registered biometric identification. Thus, subsequent use of the VC to generate VPs will be subject to verifying a biometric input to the linked biometric template. Because the VP contains the information needed to verify the user's identity, a verifier may do so even if they lack a network connection that would allow them to look up the user in the organization's database.

In a second use case, the user may use the VC obtained (e.g., as described in the previous paragraph) to execute a financial transaction. For example, the user may receive a cryptocurrency payment (e.g., in Stablecoin). Later, the user may use their cryptocurrency funds to obtain goods or services in a local market, or obtain local currency from a currency exchange kiosk. If the vendor is also registered within the organization ecosystem (e.g., using the same or complimentary digital wallet application), the user and vendor can exchange data locally (e.g., using tap-to-pay or a quick response (QR) code). Because each device (e.g., the user's mobile phone and the vendor's point-of-sale device (PoS)) possesses a VC issued by the organization, the devices can verify the other's identity for purposes of authorizing the transaction even in absence of network connectivity, and one or both devices can later record the transaction to a registry (e.g., a distributed ledger) when a network connection becomes available. In some cases, only a hash of the transaction (e.g., the time, date, and amount) is recorded, without any personally identifiable information (PII) corresponding to either party. Thus, the user's, vendor's, and officer's identity remains private and off the registry.

In a third use case, the user may use the VC obtained (e.g., as described above) to obtain a new VC that associates the user with an attribute. For example, the user may complete an educational or training program sponsored by the organization. Because the organization has already verified the user's identity, the organization's system recognizes the user as a verified beneficiary. An officer of the organization such as a program lead may digitally sign a new VC that represents a digital diploma stating that the user completed the program. The new VC may supplement or replace the original VC. Because the new VC represents the digital diploma signed by the organization, the user can prove to a verifier that she has earned the diploma, even if the verifier is unable to use a network to check the organization's records. By extension, the system may grant VCs corresponding to many different types of attributes, providing users with portable digital credentials that they may use to reliably prove the attribute(s) using the VC and their private key.

In a fourth use case, the user may travel to a different location (e.g., another city, state, or country) and apply for a work permit with a local government agency. An officer of the local government agency may be registered with the organization, and use their device to scan the user's mobile phone. The user may use their digital wallet application to approve (e.g., using a biometric input) presentation of a VP. The officer's device may verify the digital signatures in the VP, which proves the user's identity as established with the trusted issuer and/or the user's possession of an attribute such as the diploma earned in the previous use case. The proof may be verified in seconds, even without a network connection to the organization's electronic records.

In each of the above use cases, the user may fall back to a second VC if for any reason they cannot use their first VC. In each of the above use cases, the system may maintain an allowlist and check VPs against the VC hashes contained therein. Various other use cases of the described system are possible. These features may be used alone or in combination with each other and/or other features described herein. Various operations of the systems and devices may be subject to user approval. The system may be implemented in a manner that ensures compliance with applicable laws, regulations, standards, etc., in the region(s) where the user, devices, and/or systems are located.

FIG. 1A illustrates an example environment 101 in which a system enables privacy-preserving credentialing and payment, according to embodiments of the present disclosure. Within the environment 101, a user 15 may operate a user device 100. The user device 100 may be a personal electronic device such as a mobile phone that includes features enabling it to securely store personal information of the user 15 such as digital credentials and cryptographic keys and enforce controls on using such data. For example, the user device 100 may be configurable to enforce authentication using biometric identification, a PIN, password, etc., to prevent unwanted access to the user device 100 by individuals other than the user 15.

The user device 100 may include components such as those described in detail below with reference to FIG. 8 to allow the user device 100 to execute software such as applications ("apps"), store and retrieve data, accept inputs and provide outputs, and communicate with other device over various computer networks 199. The user device 100 may include an operating system (OS) 130. The OS 130 manages the hardware and software resources on the user device 100, provides the user 15 with configurable settings for the function and user of the user device 100, and provides various services for other software (e.g., apps) running on the user device 100. The OS 130 may allow the user to enroll a biometric identification, and set or adjust other configurable settings of the user device 100. Examples of common operating systems for personal electronic device include Android, developed by the Open Handset Alliance, and iOS, developed by Apple Inc of Cupertino, CA.

The user device 100 may include a TEE 110. The TEE 110 may include a secure processor 122, which may be a separate processor, or separate area of the main controller(s)/processor(s) 804 of the user device 100. The secure processor 122 may include architectural protections (e.g., built into the hardware) that allow it to perform certain, predefined functions that prevent interference from software executing on the main controller(s)/processor(s) 804. The TEE 110 may include a secure storage 124, which may be protected by hardware-based encryption to prevent reading and tampering of the software and data stored thereon. The TEE 110 may include further features to prevent other devices from attempting to "impersonate" the user device 100 by duplicating or simulating the TEE 110. For example, in some implementations, the TEE 110 may include one or more private keys embedded directly into the secure processor 122 and/or main processor of the user device 100 during manufacturing (e.g., using a one-time programmable memory such as an eFuse). Hard-coded private keys such as these may create a "hardware root of trust" that prevents simulation of the TEE 110 and its private keys by software means. In some implementations, a VC 125 may be tied to one of these embedded cryptographic keys in addition to a Priv-K 112 and Pub-K 114 created by the TEE 110 on command, as described below.

The user device 100 may execute a digital wallet application (wallet 120). As used herein, the wallet 120 is software executing on the user device 100 to enable the user 15 to perform certain tasks in a secure manner. For example, the wallet 120 may allow the user 15 to register with a trusted issuer to obtain digital credentials. The wallet 120 may then use digital credentials to authenticate the user 15 with other entities; for example, to prove their identity and/or attributes, access IT systems, and/or engage in commercial transactions (e.g., by making electronic payments at a point-of-sale device). The wallet 120 may allow the user 15 to engage in financial transactions such as making and receiving electronic payments via traditional banking and/or cryptocurrency.

The wallet 120 may include security features to prevent unwanted access by individuals other than the user 15. For example, the wallet 120 may be protected by a PIN, password, and/or a biometric lock. The biometric lock may require the user 15 to provide a biometric ID to open and use the wallet 120. The biometric ID may be, for example, a fingerprint or face scan. The wallet 120 may prompt the user 15 to create a biometric ID. The user 15 may provide a biometric input, which the wallet 120 may use to create a biometric template. When the user 15 subsequently attempts to open and use the wallet 120, the wallet 120 may prompt the user 15 for their biometric identification. The user 15 may enter a biometric input, and the wallet 120 may compare the biometric input to the previously created biometric template. If the wallet 120 determines that the biometric input matches the biometric template within a threshold level of confidence, the wallet 120 may allow the requested use.

The wallet 120 may use the TEE to store data and perform certain operations. The wallet 120 may use the TEE to generate cryptographic key pairs and securely store the private keys. Cryptographic key pairs may be used to establish a decentralized identifier (DID) for the user 15, register a passkey for accessing a resource system, digitally sign documents, etc. For example, the wallet 120 may use the TEE to store digital credentials (VCs) received from a trusted issuer, and use the VCs to generate VPs. The wallet 120 may use the TEE to generate, store, and match biometric templates to biometric inputs.

The TEE 110 may enforce policies on access to data stored in the secure storage 124 and/or on executing operations using the secure processor 122. For example, the TEE 110 may only make a set of limited, predefined functions available to the wallet 120 and other software executing on the device. Moreover, the TEE 110 may require a heightened level of authentication for the use of certain data and/or operations. For example, the TEE 110 may forbid use of a cryptographic key (e.g., to digitally sign a VC) unless the user 15 authenticates themselves using a biometric input. In some cases, the TEE 110 may link a cryptographic key and a certain biometric template. Thus, if the user 15 replaces their biometric template with a new biometric ID (e.g., rescanning their fingerprint, or changing from fingerprint ID to facial recognition ID), the TEE 110 may delete the linked cryptographic key.

In various use cases, the user device 100 may execute various apps in addition to the wallet 120; for example, the user device 100 may include various phone and or messaging apps, email clients, web browsers, resource-specific apps (e.g., corresponding to a particular bank, airline, store, etc.), games, and so on.

The user device 100 may interact with various other system devices within the environment 101. The various system devices may correspond to entities such as a verifier system 140, a trusted issuer (trusted issuer system 150), one or more resource systems 160, a point-of-sale device (PoS 170), one or more registries 180, etc. The user device 100 may interact with some system devices remotely. For example, the user device 100 may access the verifier system 140, trusted issuer system 150, resource system(s) 160, and/or registries 180 over a wide-area-network (WAN) such as the Internet. The verifier system 140, trusted issuer system 150, resource system(s) 160, and/or registries 180 may execute on one or more system devices (e.g., such as a system device 800 illustrated in FIG. 8 and described in further detail below). Such system devices may sometimes be referred to as "servers," with the services and/or functions they provide being said to reside "in the cloud." Thus, the verifier system 140, trusted issuer system 150, resource system(s) 160, and/or registries 180 may each execute on the native hardware of one or more system devices 800 and/or in a virtual machine or container hosted by the system device(s) 800.

In contrast, the user device 100 may interact with a PoS 170 in person; that is, over a relatively short distance (e.g., a few inches to a few feet), with the user 15 and vendor 75 within line of sight. The user device 100 and PoS 170 may communicate using, for example, near-field communication (NFC). The user 15 may use NFC to, for example, execute contactless payments with the user device 100 similar to contactless payment with a credit card or electronic ticket. The electronic payments may be used to purchase goods or services, and/or to obtain local currency from an ATM, bank location, and/or or currency exchange kiosk.

Figure 1B:
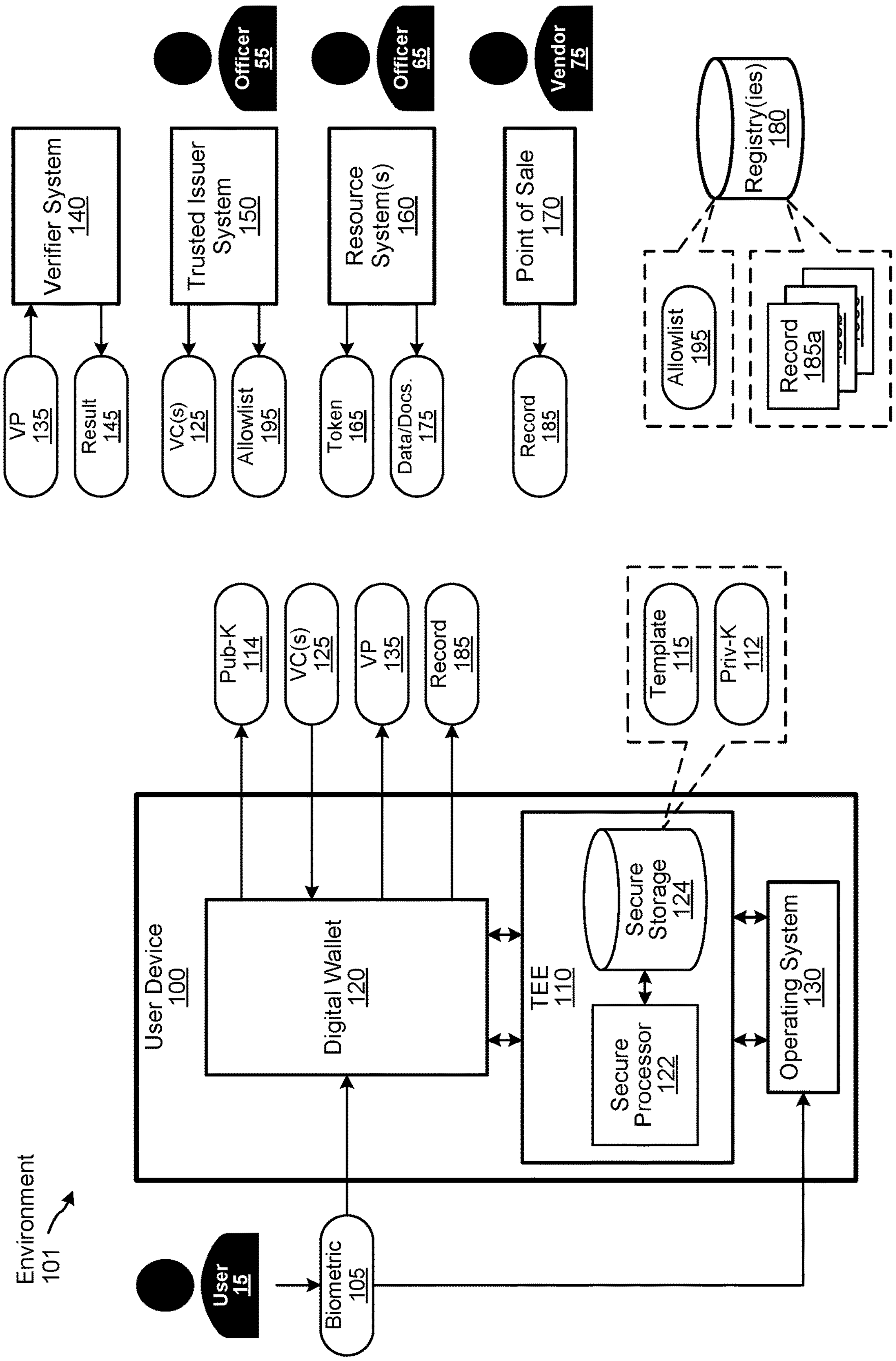
FIG. 1B illustrates a user device and system devices in further detail, according to embodiments of the present disclosure.

FIG. 1B illustrates a user device 100 and system devices in further detail, according to embodiments of the present disclosure. The trusted issuer may be responsible for verifying users' identities and issuing digital credentials such as VCs 125 via the trusted issuer system 150. In some implementations, the trusted issuer may maintain an allowlist 195 containing hashes of valid VCs 125, which the trusted issuer system 150 may record in the registries 180. The trusted issuer system 150 may represent, for example, a certificate authority, an identity provider (IdP), and/or an organization such as a government or an NGO. An officer 55 may be a representative of the trusted issuer tasked with meeting users, verifying their identification documents, and entering approval/denial into the trusted issuer system 150. Upon approval, the trusted issuer system 150 may provide the user device with a VC 125 attesting to the identity and/or attributes of the user 15. The identity represented in the VC 125 may correspond to a decentralized identity (e.g., associated with a cryptographic key pair generated by the user device 100) and/or an identity within the organization.

The VC 125 may be a document, for example, a JavaScript Object Notation (JSON) file containing various pieces of information. For example, the VC 125 may include the identity of the issuer, an timestamp of issuance and/or expiry, a subject (e.g., identity of the holder), the subject identity attributes (e.g., the holder's title within an organization, age, citizenship, certifications held, etc.), and/or a cryptographic proof such as a digital signature of the trusted issuer.

The trusted issuer system 150 may issue a VC 125 for a cryptographic key that is linked to a particular biometric identification. The TEE 110 may generate a cryptographic key pair that is linked to the current biometric template. The TEE 110 may condition use of the cryptographic key pair on authenticating a biometric input 105 that matches the biometric template 115. If the biometric input 105 does not match the biometric template 115, the TEE 110 may not permit use of the cryptographic key. If the user 15 enrolls a new biometric identification, which results in replacing the biometric template 115 with a new one, the TEE 110 may delete cryptographic keys linked to the old biometric template 115.

In some cases, the user 15 may manually configure the linking of cryptographic keys to the biometric identification as a setting in the user device 100. In some cases, the organization may manage the security settings of the user device 100. To generate a cryptographic key pair to a biometric template 115, the user 15 may first enroll their biometric identification. The user 15 may enroll their biometric identification using the settings of the OS 130. The user 15 may request enrollment, and the OS 130 may prompt the user for a biometric input 105. The user 15 may provide the biometric input 105, which the OS 130 may send to the TEE 110. The TEE 110 may process the biometric input 105 to generate the biometric template. For example, the TEE 110 may extract features from the biometric input 105. The extracted features may correspond to features expected to differ between different biometrics of the same kind (e.g., emphasizing the difference between fingerprint patterns on different fingers, geometric relationships between different facial features on different faces, etc.). In some implementations, the feature extractor may include a machine learning model trained to differentiate features between biometric inputs from different individuals, while recognizing similarity between biometric inputs from the same individual (e.g., using contrastive learning). The TEE 110 may quantify the extracted features to generate the biometric template 115 in the form of a multi-dimensional vector. The TEE 110 may store the biometric template 115 (e.g., the vector) in the secure storage 124. When the user device 100 receives a biometric input 105, it may send the biometric input 105 to the TEE 110 for comparison to the stored biometric templates 115. The TEE 110 may use the same feature extraction process to generate a vector of the biometric input 105, and compare the vector to those of the biometric templates. The TEE 110 may compare the biometric input vector to the biometric template vector(s) using one or algorithms; for example, determining a Hamming distance, Euclidian distance, cosine distance, dot product, etc., between the biometric input 105 and the biometric templates 115. The TEE 110 may return an indication of match if the similarity between the biometric input 105 and a biometric template 115 exceeds a particular threshold and/or satisfies some other condition for matching. If the TEE 110 determines that the biometric input 105 does not meet the similarity threshold with a biometric template 115, the TEE 110 may return an indication that no match was found and/or that the biometric input 105 could not be validated.

Once the user 15 has enrolled their biometric identification, the TEE 110 may be able to generate a cryptographic key pair that is linked to the biometric template 115. The cryptographic key pair may include a private key (Priv-K 112) and a public key (Pub-K 114). The TEE 110 may store the Priv-K 112 in the secure storage 124. The Priv-K 112 may be stored securely such that it never leaves the TEE 110 or the user device 100. The TEE 110 may use the Priv-K 112 to apply digital signature to data such as the VC 125; however, the TEE 110 may condition use of the Priv-K 112 on matching a biometric input 105 to the biometric template 115 (e.g., the biometric template 115 that was enrolled at the time the Priv-K 112 and Pub-K 114 were generated). If the user 15 enrolls a new biometric identification, the TEE 110 may replace the biometric template 115 and delete any linked cryptographic keys.

The TEE 110 may allow use of the Pub-K 114 by the wallet 120 to, for example, request a VC 125 that is linked to the Priv-K 112. The wallet 120 may send the Pub-K 114 to the trusted issuer system 150. The trusted issuer system 150 may record the Pub-K 114 in the payload of the VC 125. The trusted issuer system 150 may return the VC 125 to the wallet 120, which may store it in the TEE 110. If the user 15 subsequently tries to use the VC 125 to generate a VP 135. A VP is a document offered by a prover to a verifier to prove a claim; in this, case, that the user 15 possesses the correct VC 125. In some cases, the wallet 120 can use the TEE 110 to generate a VP 135 by digitally signing the VC 125 using the Priv-K 112 (e.g., subject to the TEE 110 verifying that the user's biometric input 105 matches the biometric template 115 linked to the Priv-K 112). In some implementations, the TEE 110 can generate a VP 135 that represents a zero-knowledge proof of possession of the VC 125 without divulging any details of the VC 125 (e.g., the user's identity, attributes, etc.) to the verifier, as described further below. When the user requests a VP 135 and authenticates the request by providing a biometric input 105 that matches the biometric template 115 linked to the Priv-K 112, the wallet 120 may generate the VP 135 by digitally signing the VC 125 using the Priv-K 112. An entity verifying the VP 135 may extract the Pub-K 114 from the VP 135 and use it to check the digital signature. If the Pub-K 114 matches the digital signature on the VP 135, the verifier may trust that the user 15 is the proper holder of the VC 125. If the digital signature on the VC 125 in the VP 135 matches the public key of the trusted issuer system 150, the verifier can trust that the VC 125 was issued by the trusted issuer system 150 and, by extension, that the trusted issuer verified the user's identity.

The TEE 110 may link use of the Priv-K 112 to the particular biometric template 115 such that the TEE 110 may deny a request to use the Priv-K 112 if the request is not accompanied by a biometric input 105 that matches the biometric template 115. Depending on the particular user device 100 and/or TEE 110 (e.g., manufacturer and/or model), the TEE 110 may only recognize a single biometric template 115 such that the TEE 110 requires a matching biometric input 105 to authenticate the use of any biometric-linked private keys generated by the TEE 110, and a change or update to the biometric template 115 may cause the TEE 110 to delete those biometric-linked keys or otherwise render them unusable. In other cases, the TEE 110 may recognize more than one biometric template 115, with a first biometric template 115 linked to a first private key (or multiple private keys), and a second biometric template 115 linked a second private key (or multiple private keys). If a particular biometric template 115 is deleted or replaced, however, the TEE 110 may delete the corresponding cryptographic key(s) linked to that template.

In some cases, a user 15 may return to the trusted issuer to obtain a new VC for an attribute. For example, a VC may attest to the user's 15 age, place of residence or citizenship, title and/or permissions within the organization, diploma's or certifications earned, etc. In some cases, the officer 55 may verify that the user 15 has and/or has earned a credential such as a diploma; for example, by verifying documents provided by the user 15 and/or verifying that the user 15 has fulfilled the necessary requirements such as completing the coursework. When obtaining a new VC 125, the user 15 may use their identity already established within the system as evidenced by their current VC 125 (e.g., the user's primary digital credential corresponding to the biometric-linked cryptographic key). Upon approval by the officer 55, the trusted issuer system 150 may create a new VC 125, which the trusted issuer system 150 may digitally sign using a private key. Thus, an entity knowing the trusted issuer system's 150 corresponding public key may verify the provenance of a particular VC 125; for example, by using the public key to verify the digital signature.

In some implementations, the trusted issuer system 150 may additional update the allowlist 195 in the registry 180. The updated allowlist 195 may include the new VC 125 while omitting the obsolete VC 125. This may prevent security issues arising from stale and/or duplicate credentials. The trusted issuer system 150 and/or other parties may check VPs against the VCs 125 recorded in the allowlist 195 to determine whether the VC 125 used to generate the VP is still valid. In some implementations, the trusted issuer system 150 may create the allowlist 195 using hashes of the VCs 125 indexed on the users' respective central user management ID (e.g., as assigned by the trusted issuer), DID, and/or public keys. To check a VP, an entity may use the user's ID or public key contained in the VP to identify a VC hash in the allowlist 195. If they allowlist 195 includes a VC has corresponding to the user's public key, the entity may extract the VC from the VP, hash the extracted VC, and determine whether it matches the VC hash associated with the public key in the allowlist 195.

In some implementations, a VC 125 may include multiple claims corresponding to different attributes. The trusted issuer system 150 may sign each claim in the VC 125 individually, which may allow the user 15 to selectively disclose individual attributes/claims. The user 15 may use the wallet 120 to select which attributes to disclose in a VP 135. The wallet 120 may generate the VP 135 for the individual attribute such that the verifying party can verify that the trusted issuer system's signature on the individual attribute. In addition, the wallet 120 can include in or with the VP 135 a hash of the entire VC 125, signed by the wallet 120. This may allow the verifying party to determine that the hash of the VC 125 matches the VC hash in the allowlist 195. But the hash of the entire VC 125 obscures the contents of the VC 125 such that none of the individual attributes can be extracted from the hash. In this manner, the verifying party may verify both the attribute and the current validity of the entire VC 125, but without seeing the other attributes contained in the VC 125.

In some cases, a user 15 may have to change their biometric identification (e.g., register a new biometric template 115). For example, an abrasion or adhesive may alter the user's fingerprint. Similarly, if the camera or scanner's optics are dirty/damaged, a biometric input 105 may be obscured. In other cases, a user's features may change due to, for example, makeup or accessories, illness or injury, etc. Thus, in some implementations, the trusted issuer system 150 may provide a user with two VCs 125; for example, a primary VC 125 linked to a particular biometric template 115, and a secondary VC 125 that isn't linked to a particular biometric template 115. The primary VC may correspond to broad permissions; for example, the user may use this VC 125 to obtain a new VC (e.g., a secondary VC and/or a new primary VC corresponding to a new attribute), establish their identity, gain access to a restricted resource system 160, execute a financial transaction at a PoS 170, etc., for as long as the primary VC remains valid. The trusted issuer system 150 may additionally provide a secondary or backup VC that is not linked to a particular biometric template. The user 15 may access the secondary VC using various means of unlocking/accessing the user device 100. In some cases, the user may be able to transfer the secondary VC to another device. The secondary VC may correspond to a narrower set of permissions. For example, rather than permitting the same level of authorization/access as the primary VC, the secondary VC may allow the user 15 to electronically register (e.g., without having to produce physical documents in a particular location) to obtain temporary authorization/access by way of a temporary VC. When the user 15 requests the temporary VC, the trusted issuer system 150 can verify that the user's credentials are still valid by, for example, checking the allowlist 195. The temporary VC may allow the user 15 to access a resource system 160 for a limited time, execute a single or limited number of financial transactions at a particular PoS 170, or execute transactions for a limited total amount. This may allow the user 15 the ability to travel to a new location, establish their identity, access their accounts, and/or perform their duties without having to reregister by presenting physical documents to an official, even if they have had to change their biometric identification or personal electronic device.

The resource system(s) 160 may be a computer system (e.g., of the organization) that the user 15 wishes to access and/or a computer system used by a local office or agency (e.g., an office of the organization or a government agency) for purposes of authenticating a user 15 based on their digital credentials. For example, the user 15 may use their user device 100 to authenticate themselves with a computer system of an organization using a VC 125 obtained from the trusted issuer system 150. In some implementations, the resource system(s) 160 may verify the user's VP itself, while in other implementations the user 15 may authenticate themselves with a separate verifier system 140. Upon verifying the user's VP and, in some cases, verifying the VC hash on the allowlist 195, the verifier system 140 and/or resource system(s) 160 may grant the user 15 an authentication token 165 which may allow the user 15 to access the resource system(s) 160 for a period of time. In some cases, the authentication token 165 may go to the user device 100, enabling the user device 100 to access the resource system(s) 160. In other cases, the user 15 may use their user device 100 to authenticate themselves to access the resource system(s) 160 using a different device such as a laptop or desktop computer. In such cases, the authentication token 165 may go to the other device. In either case, the resource system(s) 160 and/or verifier system 140 may present the user device 100 with an image of a QR code to scan using the wallet 120. The QR code may include information telling the wallet 120 how to generate and send a VP 135 for verification.

In some implementations, the trusted issuer system 150, resource system(s) 160, and/or PoS 170 may delegate verification of VPs 135 to a verifier system 140. The verifier system 140 may include hardware and/or software configured to verify VPs 135 (including ZKPs, as described below) and, in some implementations, verify the current validity of VCs 125 against the allowlist 195. When the user 15 offers a VP 135, the receiving party may call upon the verifier system 140 to verify the VP 135. Prior to or after verifying the VP 135, the verifier system 140 may check the current validity of the digital credential indicated by the VP 135 by checking it against the allowlist 195 stored in the registry 180. If the digital credential is still valid, the verifier system 140 may return a verification result 145 to the receiving party, which in turn may authorize the requested access to the resource. In some cases, the verifier system 140 may create an authentication token that may grant the user's user device access to a resource for a period of time. In some implementations, the verifier system 140 may verify a ZKP itself and/or delegate verification to another component or system. For example, the component or system that verifies the proof may do so without obtaining any secret information about the user 15, including identifiers and/or other attributes that may be contained in the VC 125. For example, verification may be performed by a cryptographic miner, who may issue a verification receipt upon successful verification. The verifier system 140 and/or receiving party may grant the requested access upon receipt of the verification receipt.

In some implementations, the VP 135 can be a zero-knowledge proof (ZKP) of the identity and/or attribute the user 15 wishes to prove. For example, the user 15 may wish to prove that the trusted issuer has granted them permission to access the resource system(s) 160, without divulging their identity when accessing the resource system(s) 160. A ZKP may allow a party to prove a claim without revealing any additional information. For example, a "prover" can share a proof of the claim with a "verifier" who can verify the accuracy of the proof. In some cases, a ZKP may not prove the claim with certainty, but the acts of proving and verifying may be repeated until the prover demonstrates to the verifier (and, in some case, an external observer or observers) a sufficiently high statistical likelihood that the claim is true, rather than a series of lucky guesses. In this case, the prover may be the user 15 and/or the user device 100, while the verifier may be the trusted issuer system 150 and/or officer 55, resource system(s) 160 and/or officer 65, PoS 170 and/or vendor 75, registry 180, and/or other entities or individuals operating in the environment 101.

A ZKP of a claim may satisfy three properties: completeness, soundness, and zero-knowledge. Completeness means that if the claim is true, an honest prover can convince an honest verifier of the claim. Soundness means that if the claim is false, no cheating prover can convince an honest verifier of the claim (e.g., except for some very small probability, which may be reduced by further iterations of proof). Zero-knowledge means that if the claim is true, no verifier (or observer) will learn anything other than the fact that the claim is true.

A ZKP may be interactive or non-interactive. An interactive proof system may involve a repeated exchange of messages between the prover (e.g., the user device 100) and the verifier (e.g., the resource system(s) 160 and/or verifier system). In an interactive proof system, it may be assumed that the user device 100 has access to abundant computational resources but cannot be trusted. In contrast, the verifier system may be assumed to be trustworthy but have limited computational resources. The interactive proof system may also involve an ability of the verifier system to make random choices. Through an exchange of messages, the user device 100 may establish a near-certain likelihood that its claim is true, without divulging any information beyond the fact of the truth of the claim. For example, the verifier system may determine that receiving N consecutive verifiable proofs from a user device 100 makes the probability that the user device 100 is asserting a false claim exceedingly low. The resource system(s) 160 and/or the verifier system may select a value of N and/or a threshold confidence score (e.g., corresponding to a likelihood that the user device 100 possesses the credentials it asserts) based on, for example, the potential harm of a bad actor accessing the resource system(s) 160 and/or the sensitivity of the data stored therein. An example of a zero-knowledge protocol that may be used to perform an interactive ZKP is a zero-knowledge Scalable Transparent Argument of Knowledge (zk-STARK); however, some versions of zk-STARK may operate non-interactively.

A non-interactive ZKP may offer advantages over interactive proofs. For example, a non-interactive proof may be used when the prover and verifier cannot interact (e.g., communicate in real time). Thus, non-interactive proofs may be useful in decentralized systems such as a distributed ledger system made up of the distributed nodes. The distributed nodes may use the ZKP to verify transactions (e.g., adding new policies to the ledger) without oversight of a central authority. For example, a distributed node may verify that the trusted issuer system 150 (and/or other component of the system) is authorized to write policies, public keys, and/or other data to the distributed ledger system. An example of a non-interactive zero-knowledge protocol is a zero-knowledge Succinct Non-interactive Argument of Knowledge (zk-SNARK). A ZKP protocol (e.g., such as zk-SNARK, zk-STARK, and/or others) may be transparent and/or universal. A transparent protocol is one that does not require a trusted setup but may rely on public randomness. A universal protocol is one that does not require a separate trusted setup for each arithmetic circuit, where an arithmetic circuit represents a directed acyclic graph involving the addition and/or multiplication of numbers; for example, to compute a polynomial.

In some implementations, the trusted issuer system 150 (or other entity) may provide a trusted setup for the zero-knowledge proof. In some implementations, a different component (e.g., independent of the trusted issuer system 150, user device 100, and the resource system(s) 160) may provide the trusted setup. For example, the trusted issuer system 150 may send prover setup to the user device 100 and verifier setup to the resource system(s) 160. The prover setup and the verifier setup may be collectively referred to as a "trusted setup". In some implementations, the prover setup may be data representing, for example, a prover key and/or a structured reference string. In some implementations, the verifier setup may be data representing, for example, a verifier key and/or a structured reference string. The trusted setup may facilitate the zero-knowledge proof between the user device 100 (e.g., the prover) and the resource system(s) 160 (e.g., the verifier). A ZKP may be used by the user 15 to establish to the resource system(s) 160 that the user 15 possesses credentials that correspond to policies for access of the resource system(s) 160. By using the ZKP, the user 15 may keep their exact identity hidden from the resource system(s) 160 and/or any observer(s) of the data that passes between the user device 100 and the resource system(s) 160. An observer may, however, be permitted to witness the operation(s) performed and/or the results thereof, and see that the resource system(s) 160 authorized the operation(s) based on a policy that may also be visible to the observer. The resource system(s) 160 may therefore balance the interests of privacy for the user 15 and trust on the part of the observer.

In some implementations, the trusted issuer system 150 may provide VCs 125 to the user device 100. The user device 100 may include a TEE 110 or similar secure (e.g., encrypted) data storage component on and/or associated with the user device 100. The VCs 125 may correspond to one or more attributes about (or assigned to) the user 15. For each attribute ("att"), the trusted issuer system 150 may send to the user device 100:

$$\sigma_{att} = \mathrm{sign}_{pk(IdP)}(att \,\|\, \mathrm{pk}_{Requestor})$$

The user 15 may wish to prove a claim c about an attribute; for example, that the user 15 is over the age of 18, the user 15 is a member of organization ABC, the user 15 is authorized to read, modify, and/or write data to the resource system(s) 160, the user 15 has been granted Tier-2 access but not Tier-1 access, etc. with respect to permissions for use of the resource system(s) 160. As can be appreciated, a number of claims/attributes are possible. The user 15 may prove to the resource system(s) 160 that c(alt) is true, that the trusted issuer system 150 certifies that the user 15 has the attribute all, and that alt was signed (e.g., that all was used to assert claim c).

If the ZKP protocol includes a trusted setup, the user 15 may fetch the prover setup from the trusted issuer system 150. The prover setup may represent a prover key for the corresponding claim $PK_{IdP,c}$ and a structured reference string $SRS_{IdP}$.

Using the prover setup, the wallet 120 may build the following proof:

$$P_{att,Requestor,IdP} = \mathrm{Proof}(\sigma_{att} \text{ is valid and } c(att) == \text{true}, PK_{IdP,c}, SRS_{IdP})$$

Which verifies that:

$$\mathrm{verify}(\sigma_{att}, att \,\|\, \mathrm{pk}_{Requestor}) == \text{true and } c(att) == \text{true})$$

The user device 100 may send the proof $P_{att,Requestor,IdP}$ to the resource system(s) 160 and/or the verifier system. If the ZKP protocol includes a trusted setup, the resource system(s) 160 and/or the verifier system may fetch the verifier setup from the trusted issuer system 150. The verifier setup may represent a verifier key for the corresponding claim $VK_{IdP,c}$ and a structured reference string $SRS_{IdP}$. The resource system(s) 160 and/or the verifier system may then verify the proof P from the user device 100:

$$\mathrm{Verify}(P_{att,Requestor,IdP}, VK_{IdP,c}, SRS_{IdP}) == \text{valid}$$

If the claim c accurately represents the identity and/or attributes contained in the VC(s) 125, the proof P will establish that c(att) is true and/or that the trusted issuer system 150 assigned all to the user 15. The resource system(s) 160 and/or the verifier system may then grant access to a protected resource (e.g., by creating an authentication token and sending it to the user device 100) or service and/or permission to execute a transaction. The user 15 may then use the resource system(s) 160 to obtain data and/or documents 175.

In some use cases, the user 15 may use the VC 125 to conduct secure transactions. For example, in some cases, the user 15 may carry a VC 125 that proves their ownership of cryptocurrency funds. If the PoS 170 and/or user device 100 has a live network connection at the time of the transaction, they user 15 may use the VC 125 to execute the transaction with the vendor 75, and one or both of the user device 100 or the PoS 170 may record a record 185 of the transaction in the registry(ies) 180. In some cases, the user 15 may carry a VC 125 from an organization that can prove to a vendor 75 that the user 15 is entitled to certain disbursements, stipends, or the like from the organization.

If the vendor 75 is registered with the same organization, they may be allowed to transact with the user 15 upon proof of the VC 125, even if one or both of the user 15 and the vender 75 lack a live network connection at the time of the transaction. For example, if the PoS 170 include a digital wallet application provided by the same organization as the wallet 120 on the user device 100, the two devices can execute the transaction and upload a record 185 of the transaction at a later time when one or both of the user device 100 or PoS 170 is back online.

The record 185 of the transaction may include certain information about the transaction (e.g., time, date, amount) but omit identifying information of the user 15. The record 185 may be stored in one or more registries 180. The registry(ies) 180 may be the same or different from the registry(ies) 180 storing the allowlist 195.

In some implementations, the registry(ies) 180 may be a distributed ledger such as a blockchain. A distributed ledger may represent a shared, replicated, and synchronized data store. A distributed ledger system may include a plurality of distributed nodes that maintain copies of data. A node may include hardware and/or software configured to receive data to add to the distributed ledger an implement a consensus algorithm to ensure the data stored by the distributed nodes is reliably replicated among them. The consensus algorithm is used to determine the correct updated ledger to represent the addition of the new data to the distributed ledger (e.g., in this case, the registry(ies) 180). Distributed nodes may form a peer-to-peer network (e.g., within and/or across the computer network 199) to propagate updates once the correct updated ledger is determined. Each distributed node will then update itself accordingly. The result is a tamper resistant record of the received data replicated across multiple nodes and without a single point of failure.

The distributed ledger may be a linear data structure (e.g., a chain such as blockchain) or a more complex structure like a directed acyclic graph. A directed acyclic graph in the context of a distributed ledger may be made up of blocks of data and edges indicating adjacency of data blocks added to the distributed ledger. Each edge is directed, indicating a direction from an existing data block to a new data added to the existing data block. The structure is acyclic in that it contains no paths by which a data block can be crossed twice by traversing any sequence of edges according to their direction (e.g., no edges are directed "backwards" in time). A data block may, however, have multiple edges directed to it and/or away from it.

In various implementations, a distributed ledger may perform a proof-of-work algorithm or a proof-of-stake consensus algorithm. A proof-of-work algorithm is a form of cryptographic proof a party can use to prove to others that it has performed a certain about of computational work. The proof is asymmetric in that a verifier may confirm the proof with minimal computational effort. An example of proof-of-work in the context of distributed ledgers is "mining" for cryptocurrency, where mining refers to the incentive structure used to encourage nodes to expend computational effort to add data blocks to the distributed ledger. In contrast, proof-of-stake protocols only allow nodes owning some quantity of data blocks (e.g., blockchain tokens) to validate and add new data blocks. Proof-of-stake protocols prevent attackers from hijacking validation by requiring an attacker to acquire a large proportion of data blocks. Proof-of-stake protocols include, for example, committee-based proof of stake, delegated proof of stake, liquid proof of stake, etc.

Distributed ledgers may be permissioned or permissionless. A permissioned distributed ledger may refer to a private system having a central authority for authorizing nodes to add data blocks. In some cases, a consortium may agree to operate a distributed ledger jointly among the participating organizations while excluding others. A permissionless distributed ledger may refer to an open or public network for which no access control is used. Any party may add to the distributed ledger, provided they satisfy the consensus algorithm (e.g., proof of work). An example of a permissionless distributed ledger is bitcoin and other cryptocurrencies that require new entries to include a proof of work.

In some implementations, the distributed nodes may be open (e.g., viewable by the public) to allow an observer to see the records 185*a*, 185*b*, 185*c*, etc., and/or the allowlist 195 (e.g., listing valid VCs 125 correspond to different users and/or trusted issuers). In some implementations, the distributed nodes may be private, prevented unauthorized observers from seeing the content of the registry(ies) 180.

Figure 1C:
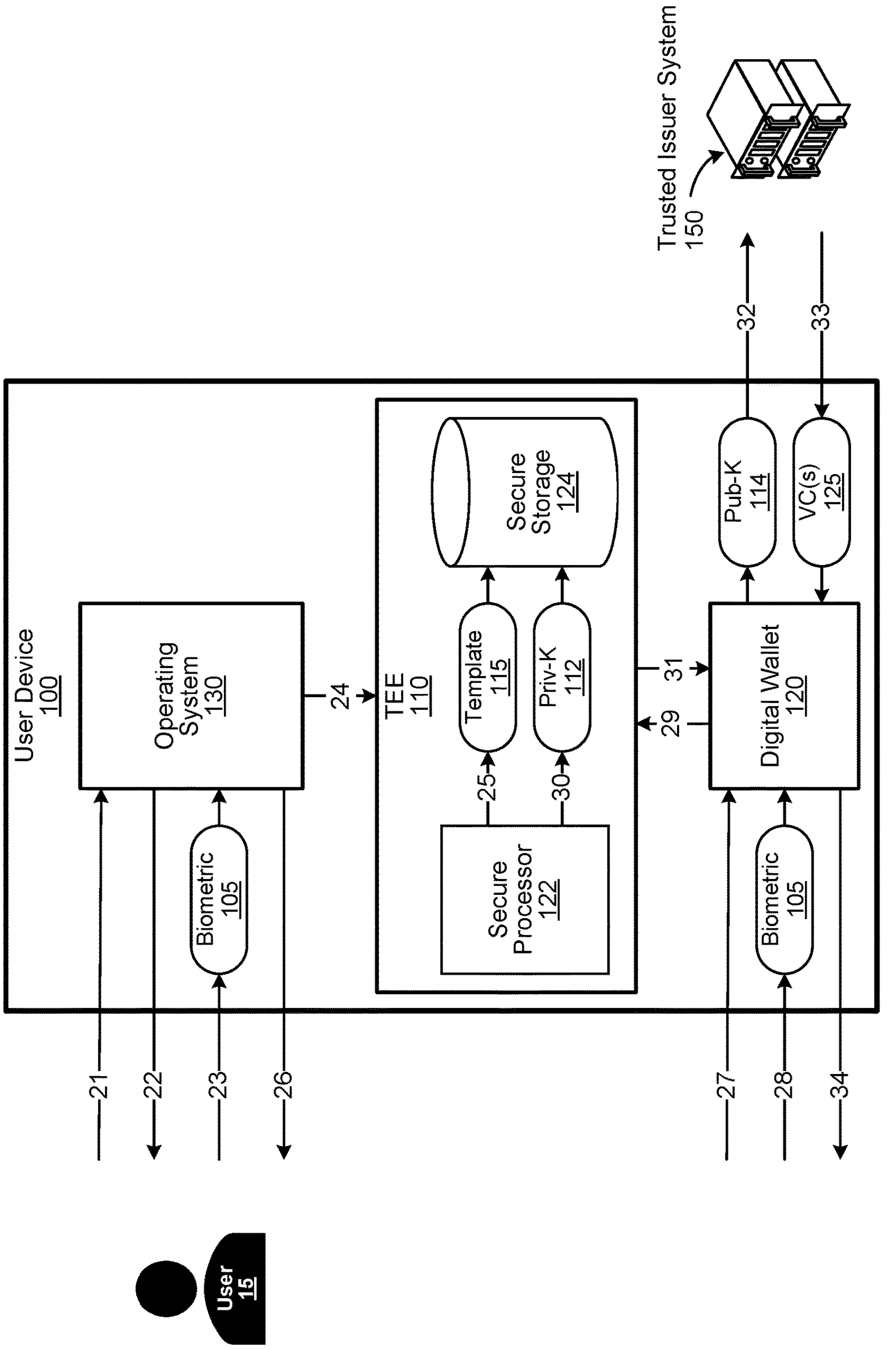
FIG. 1C illustrates an example process of enrolling a biometric identifier and obtaining a digital credential using a cryptographic key linked to the biometric identification, according to embodiments of the present disclosure.

FIG. 1C illustrates an example process of enrolling a biometric identifier and obtaining a digital credential using a cryptographic key linked to the biometric identification, according to embodiments of the present disclosure. The process may occur in stages with the user 15 enrolling their biometric identification using the OS 130 and obtaining a digital credential from the trusted issuer system 150 using the wallet 120. In some cases, the stages may occur separately and perhaps separated by a long period of time (e.g., days, weeks, months, etc.). In other cases, the stages may occur sequentially over a short period of time. In some cases, the steps of the stages may overlap and/or occur in a different order.

The first stage may include steps 21 through 26 in which the user 15 enrolls their biometric identification using the OS 130 of the user device 100. At step 21, the user 15 may open the settings of the user device 100 to enroll a new biometric identification. At step 22, the OS 130 may prompt the user 15 to provide a biometric input 105, which the OS 130 can use to generate a biometric template 105. At step 23, the user may present their biometric input 105 using, for example, a camera or sensor of the user device 100 (e.g., the camera 818 or sensor 820 shown in FIG. 8). At step 24, the OS 130 may receive the biometric input 105 and send it to the TEE 110. The secure processor 122 may use the biometric input 105 to generate a biometric template 115 and, at step 25, store it in the secure storage 124. At step 26, the OS 130 may send a message or notification to the user 15 that the user's biometric identification has been set.

At step 27, the user 15 may open the wallet 120 and request a new cryptographic key pair to be used to obtain a digital credential. The cryptographic key pair may be linked to the biometric template 115 created at step 25. In some cases, the user 15 may configure the link to the biometric template 115 in the settings of the wallet 120 and/or OS 130. In some implementations, the organization may manage the security settings of the user device 100 such that any cryptographic key pair generated by the TEE 110 is linked to the biometric template 115. In some implementations, the user 15 may authenticate the request by providing their biometric identification at step 28. At step 29, the wallet 120 may send a request to the TEE 110 to generate the cryptographic key pair. The secure processor 122 may generate a cryptographic key pair including a Pub-K 114 and a Priv-K 112. At step 30, the secure processor 122 may store the Priv-K 112 in the secure storage 124. In some implementations, the Priv-K 112 may be stored a flag or other indication that it is linked to the biometric template 115 stored at step 25. In this manner, the TEE 110 can enforce biometric identification/authentication prior to performing any operations using the Priv-K 112, such as digitally signing a VP 135. In some implementations, the TEE 110 may be configured to require biometric identification for any keys stored in the secure storage 124 and, if a new biometric identification is enrolled and the biometric template 115 is replaced, deleted, or overwritten, the private keys in the secure storage 124 are also deleted.

At step 31, the TEE 110 may send the Pub-K 114 to the wallet 120. The wallet 120 may, at step 32, send the Pub-K 114 to the trusted issuer system 150. The trusted issuer system 150 may create a VC 125, which may include the Pub-K 114, the trusted issuer's digital signature, and one or more attributes of the user (e.g., an identifier such as a central user management ID or DID, as well as additional information about the user 15 as established or verified by the trusted issuer system 150). At step 33, the trusted issuer system 150 may return the VC 125 to the wallet 120. In some implementations, the wallet 120 may store the VC 125 in the secure storage 124 of the TEE 110. In some implementations, the wallet 120 may store the VC 125 in the regular storage of the user device 100 (e.g., the data storage component 808 shown in FIG. 8). At step 34, the wallet 120 may present the user with a message that a new digital credential has been obtained.

In some cases, the steps illustrated in FIG. 1C may occur in different orders. For example, if the user 15 uses the wallet 120 to request a digital credential (e.g., as in step 27) without having enrolled a biometric identification on the user device 100, the wallet 120 may prompt the user 15 to enroll a biometric ID, and redirect the user 15 to the settings of the OS 130, which may prompt the user for their biometric ID (e.g., as in step 22). Once the user 15 has enrolled their biometric (e.g., as in steps 23 through 25), the user 15 may be directed back to the wallet 120, which may prompt the user 15 for their biometric ID (e.g., which the user may provide as in step 28) or send a request to the TEE 110 to generate the cryptographic key pair (e.g., as in step 29).

Figure 2A:
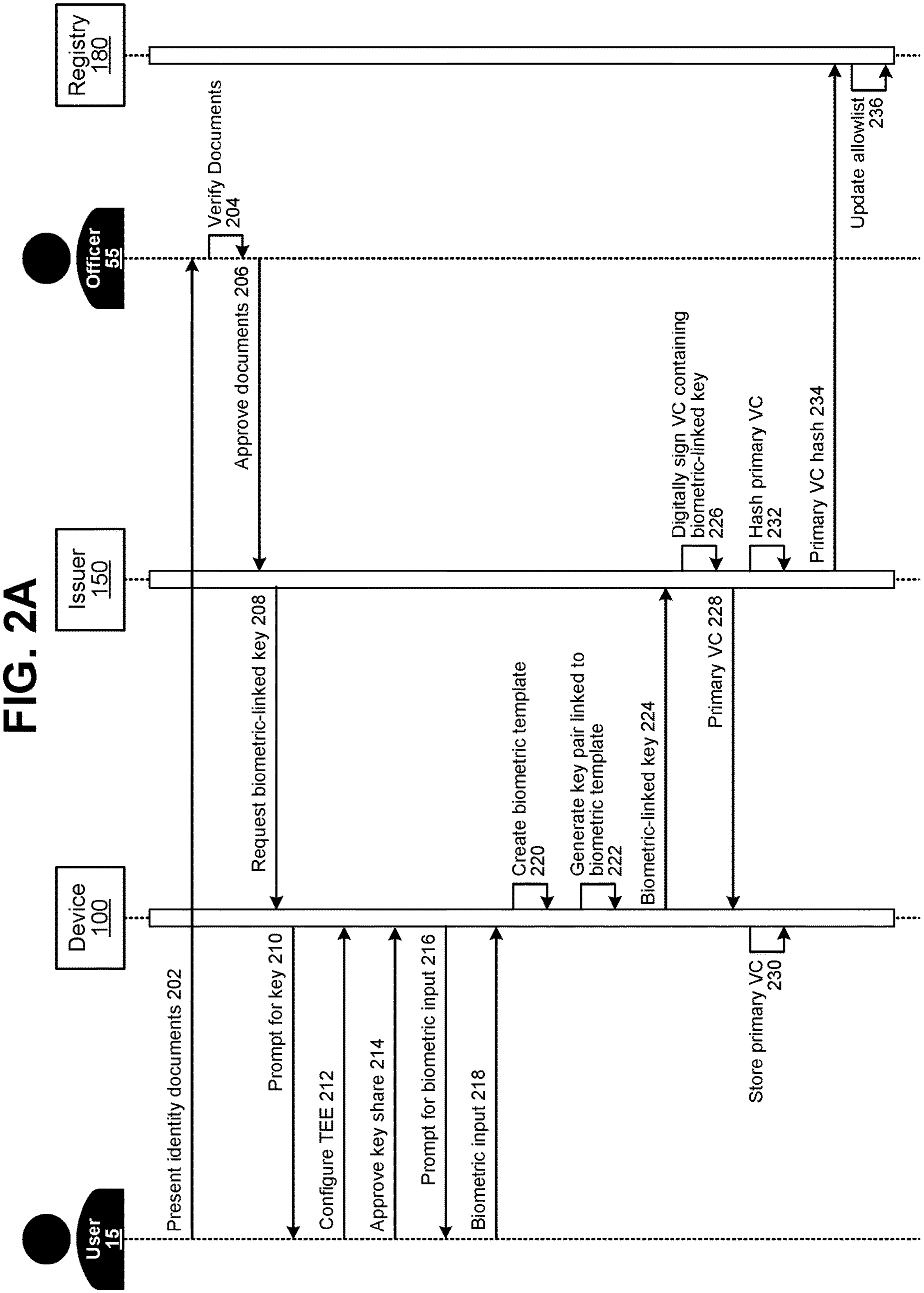
FIG. 2A is a signal-flow diagram illustrating an example registration process, according to embodiments of the present disclosure.

FIG. 2A is a signal-flow diagram illustrating an example registration process in which the user establishes their identity with the organization and receives a digital credential, according to embodiments of the present disclosure. The operations may be performed by the user device 100 (e.g., including the wallet 120 and TEE 110), and the trusted issuer system 150. In an example scenario, the user 15 may appear in person to register with an officer 55 of the trusted issuer. For example, the trusted issuer may be an organization, and the officer 55 may be an individual located at the organization headquarters with access to the trusted issuer system 150. At step 202, the user may present documents to the officer 55. The documents may be, for example, documents establishing the user's identity and/or position within (or with respect to) the organization such as a government-issued identity card, birth certificate, passport, etc. For example, the user 15 may be an employee of the organization, an agent of the organization, a contractor, etc. At step 204, the officer 55 may verify the user's documents. If the officer 55 determines that the documents are legitimate and meet the criteria for registration, the officer 55 may enter their approval into the trusted issuer system 150 at step 206.

The officer's approval may initiate the electronic portion of the registration process that will ultimately provide the user 15 with a digital credential (e.g., a VC 125). At step 208, the user 15 may present their device, and the trusted issuer system 150 may send a request to the user device 100 for a biometric-linked cryptographic key. For example, the biometric-linked cryptographic key may be a public key representing a DID of the user 15. In some implementations, the trusted issuer system 150 may include a display that presents a QR code. The user 15 may scan the QR code using their wallet 120, which will initiate the key-generation process. At step 210, the 210, the user device 100 may present the user 15 with a prompt to generate the requested cryptographic key. At step 212, the user 15 may configure the TEE 110 to generate a biometric-linked cryptographic key. At step 214, the user 15 may enter approval to the wallet 120 to share the resulting key when it is generated.

In some cases, the user 15 may enroll a biometric identification using steps 216 through 220. At step 216, the device 100 may prompt the user for a biometric input that the TEE 110 may use to create a biometric template. At step 218, the user 15 may enter a biometric input, such as a face scan, fingerprint scan, or the like. At step 220, the TEE may use the biometric input to create a biometric template. In some cases, the user 15 may use a previously enrolled biometric identification. For example, the user 15 may have previously performed operations similar to steps 216 through 220. Rather than enroll a new biometric identification, the user 15 may demonstrate to the officer 55 that the user 15 can pass the user device's biometric authentication. This may provide assurance that the subsequently generated cryptographic key pair is linked to that biometric template, and thus the user 15.

At step 222, the TEE 110 may generate a cryptographic key pair linked to the biometric template. When the TEE 110 creates the cryptographic key pair, the TEE 110 can provide confirmation that the key pair is linked to a biometric identification (e.g., the biometric template created at step 220 and/or authenticated in view of the officer 55). The cryptographic key pair may be linked to the biometric template within the TEE 110 such that the TEE 110 conditions subsequent use of the keys upon confirming that a received biometric input matches this biometric template. If the user 15 enrolls a new biometric identification, however, the TEE 110 may replace the biometric template and delete any linked cryptographic keys.

At step 224, the user device 100 may send the public key of the biometric-linked cryptographic key pair to the trusted issuer system 150 (e.g., while securely storing the corresponding private key in the secure storage of the TEE 110). When the TEE 110 shares the public key at step 224, it may do so with a verifiable indication that the corresponding private key is linked to a biometric template such that the TEE 110 can require a matching biometric input for use of that private key. At step 226, the trusted issuer system 150 may create a digital credential containing the public key received at step 224. The trusted issuer system 150 may apply a digital signature to the digital credential using their private key, and return the digital credential to the user device 100 at step 228. At step 230, the user device 100 may store the digital credential. In some cases, the user device 100 may store the digital credential securely in the TEE 110; however, this is not strictly necessary because the digital credential is not usable without the private key, which is stored securely in the TEE 110 and subject to biometric authentication. Because the digital credential includes the public key of a key pair tied to the user's biometric identification, the digital credential can allow the user to prove their identity to different entities/parties within or associated with the organization. For example, if a person other than the user attempts to use the user device 100 to generate a VP using the VC, the TEE 110 may detect a mismatch in the biometric input and the biometric template linked to the cryptographic key pair, and deny any requests to use the private key to sign a VP. Nor could another individual register a new biometric template on the user device 100 to access the digital credential.

In some implementations, the trusted issuer system 150 may maintain an allowlist of valid digital credentials. In some implementations, the allowlist may include a list of user identifiers (e.g., DID's generated by the user device 100 and/or user IDs as assigned by the trusted issuer system 150) of users holding valid digital credentials, where the user IDs are associated with a hash of the corresponding digital credential. In some implementations, the allowlist may include a list of public keys of users holding valid digital credentials, where the public keys are associated with a hash of the corresponding digital credential. In this manner, the trusted issuer and/or other entities may identify an entry in the allowlist using a user's ID and/or public key, hash a VC provided by the user, and determine whether the hash of the VC matches the hash in the allowlist. When a user obtains a new VC—for example, by repeating some or all of the operations if FIG. 2A—the trusted issuer system 150 may create a new allowlist with the user's new public key and VC hash while omitting the previous public key and VC hash. In this manner, the trusted issuer system 150 can prevent access by individuals attempting to use revoked, replaced, duplicate, stale, and/or misappropriated digital credentials.

Accordingly, the trusted issuer system 150 may, at step 232, generate a hash of the digital credential and send the VC hash to the registry 180 at step 234. At step 236, the registry 180 may record the biometric-linked public key and the VC hash in an allowlist stored in the registry 180. The VC hash may be indexed within the allowlist by the user's identifier (e.g., a central user management ID generated by the trusted issuer system 150 or a DID generated by the user device 100). In some cases, the VC hash may be indexed by the user's biometric-linked public key. In some implementations, the registry 180 may be or host a distributed ledger such as a blockchain to which the allowlist may be stored. The tamper-resistant properties of the blockchain may allow the registry 180 to serve as a reliable record of valid digital credentials.

In some cases, the system may remove a digital credential from the allowlist. For example, the trusted issuer system 150, a resource system 160, and/or a verifier system used to verify VPs 135 may detect a security vulnerability, such as repeated requests for access using VPs 135 that fail verification. In another example, a user 15 may notify the system that their user device 100 and/or VC 125 has been compromised or lost. In other cases, a user 15 may obtain a new or replacement VC 125 either because they have changed their biometric identification or earned a new attribute. Upon detecting or receiving such an indication, the trusted issuer system 150 (or another party) may generate an updated allowlist with the digital credential at issue removed. In the case of a user 15 registering a new digital credential, the previous digital credential assigned to the user may be deleted and replaced, or overwritten.

Figure 2B:
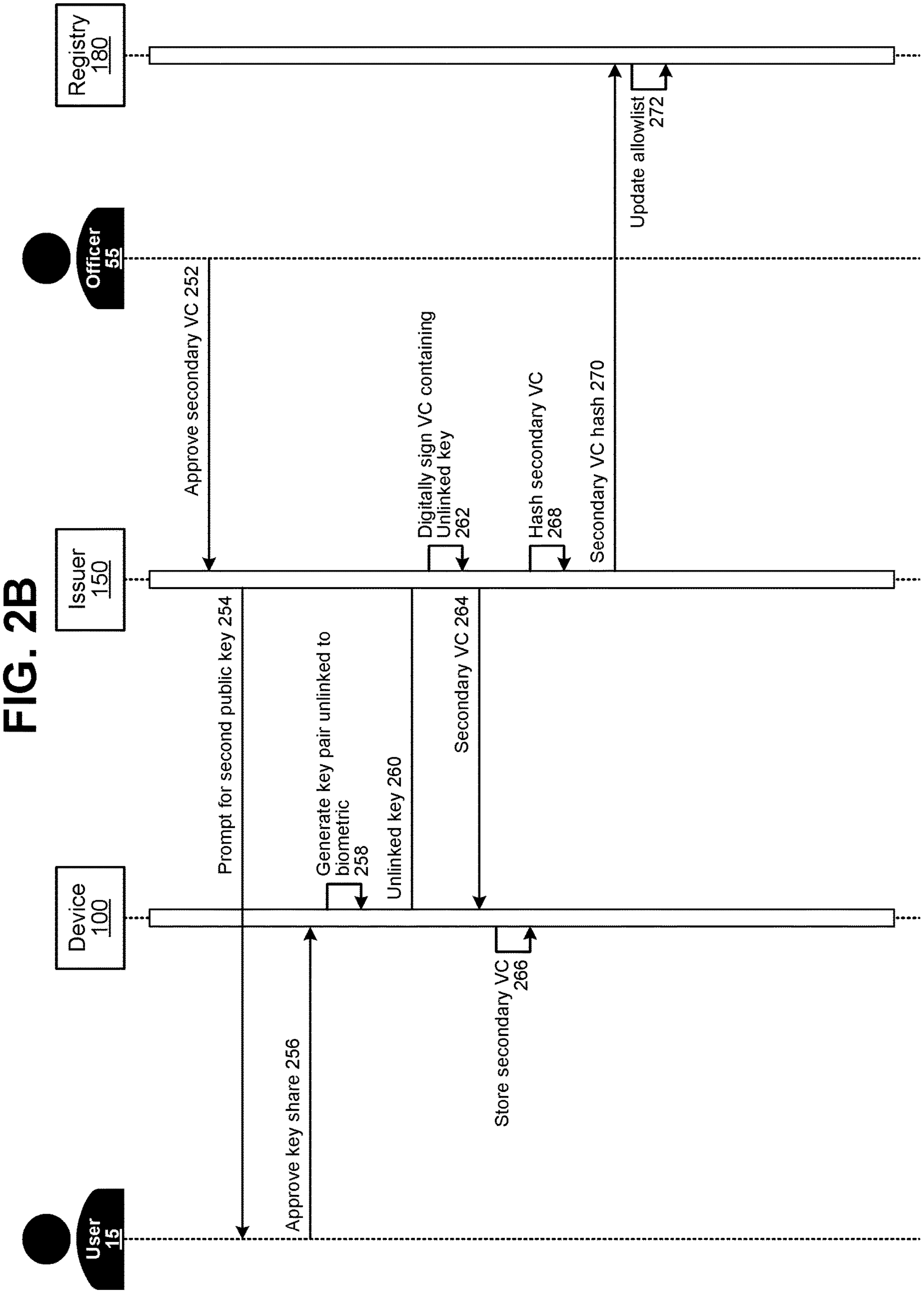
FIG. 2B is a signal-flow diagram illustrating example operations for obtaining a secondary digital credential, according to embodiments of the present disclosure.

FIG. 2B is a signal-flow diagram illustrating example operations for obtaining a secondary digital credential, according to embodiments of the present disclosure. The primary digital credential such as the one generated using the operations illustrated in FIG. 2A, may contain a cryptographic key that has been linked to a particular biometric template. Because the cryptographic key is stored in the TEE 110 and linked to a biometric template within the TEE 110, a validly signed VP of the primary digital credential may allow the user 15 the benefit of their broadest access and/or permissions within the system. But because the user 15 could lose access to the primary digital credential—for example, by changing their biometric identification or their user device—the trusted issuer system 150 may, in some implementations, provide the user 15 with a secondary digital credential that the user 15 can use as a backup credential in the event the primary digital credential (or the corresponding cryptographic keys) becomes unavailable to the user 15 for whatever reason. The secondary digital credential may also be linked to a cryptographic key pair created within the TEE; however, the verifier system 140 and/or the trusted issuer system 150 may not enforce the same restrictions on creation and/or use of this key. For example, verifier system 140 and/or the trusted issuer system 150 may not require the TEE 110 to link a cryptographic key pair created for a secondary digital credential to a particular biometric template or even a particular user device 100. Thus, the user 15 may be able to change their biometric identification and/or transfer the cryptographic keys and secondary digital credential to a user device different from the one used to register the credential. The secondary digital credential may provide the user with limited access and/or permissions within the system; however, the secondary digital credential may allow the user 15 to obtain a temporary digital credential electronically—that is, without having to make another in-person visit with their identity documents—that will grant the user 15 some benefits and/or allow them to perform certain operations based on their established identity within the system.

At step 252, the officer 55 may approve the creation of a secondary digital credential (e.g., based on the same verification performed at step 204, or a separate verification), and enter the approval into the trusted issuer system 150. At step 254, the trusted issuer system 150 may prompt the user 15 for a second public key. In this case, however, the trusted issuer system 150 may not impose restrictions on the creation of the public key, such as linking to a particular user device 100 and/or biometric template. At step 256, the user 15 may enter approval to create and share a new cryptographic key. At step 258, the TEE 110 may generate the cryptographic key pair that is not linked to a biometric template. In some cases, the wallet 120 and/or TEE 110 may require the user 15 to authenticate themselves with a biometric input and/or other method; however, the user 15 could change the biometric input and generate a new template without losing the ability to use the new cryptographic key pair or the corresponding secondary digital credential.

At step 260, the user device 100 may send the public key of the unlinked cryptographic key pair to the trusted issuer system 150. At step 262, the trusted issuer system 150 may create the secondary digital credential, which may include the public key and the trusted issuer's digital signature. At step 264, the trusted issuer system 150 may send the secondary digital credential back to the user device 100 for secure storage, at step 266, in the TEE 110.

In some implementations, the trusted issuer system 150 may, at step 268, generate a hash of the secondary digital credential and send it to the registry 180 at step 270. At step 272, the registry 180 may update the allowlist to reflect the additional credential assigned to the user 15 (e.g., by deleting or overwriting the previous entry containing the primary VC hash).

Figure 3A:
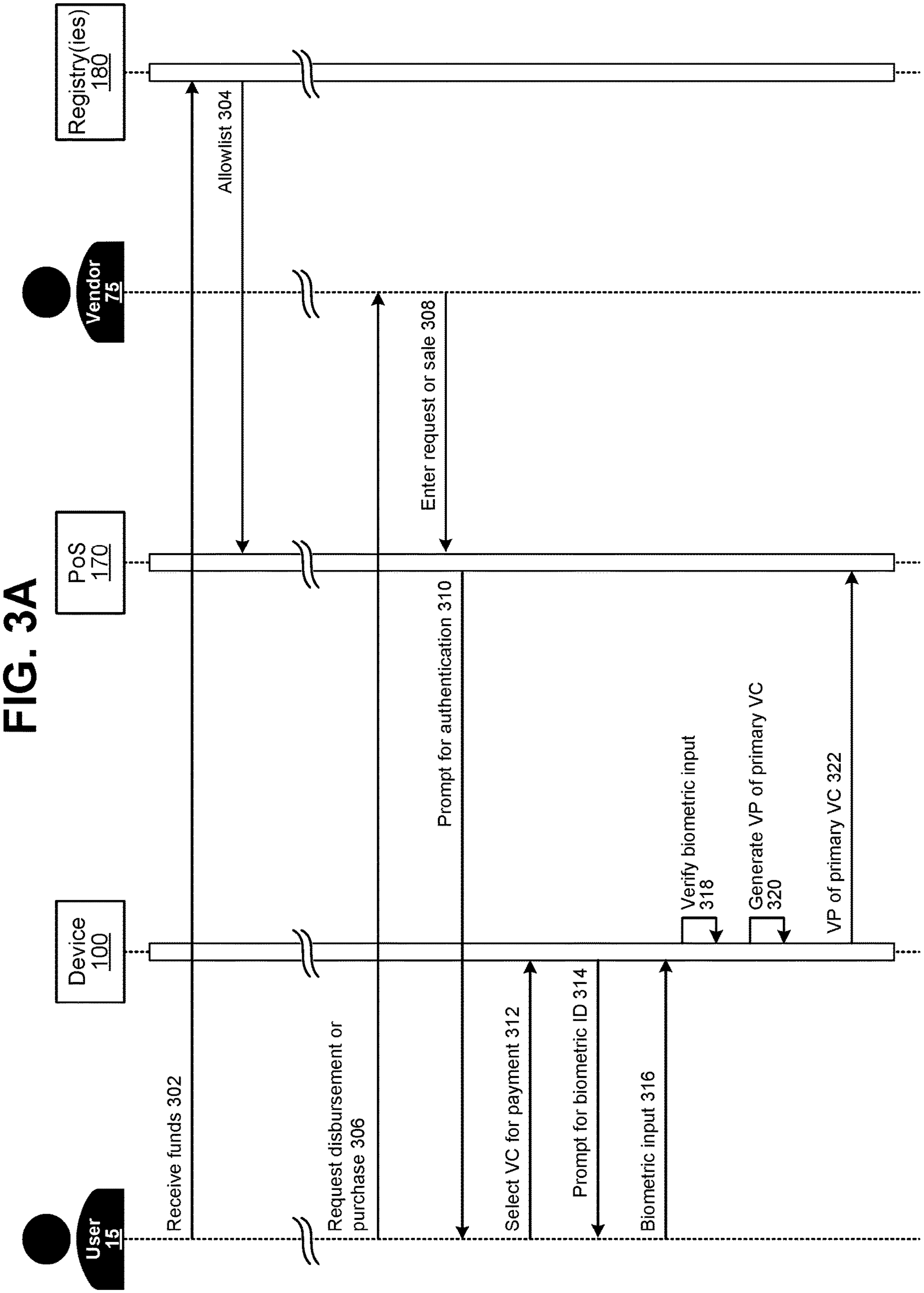
FIGS. 3A and 3B are signal-flow diagrams illustrating example operations of a financial transaction, according to embodiments of the present disclosure.
Figure 3B:
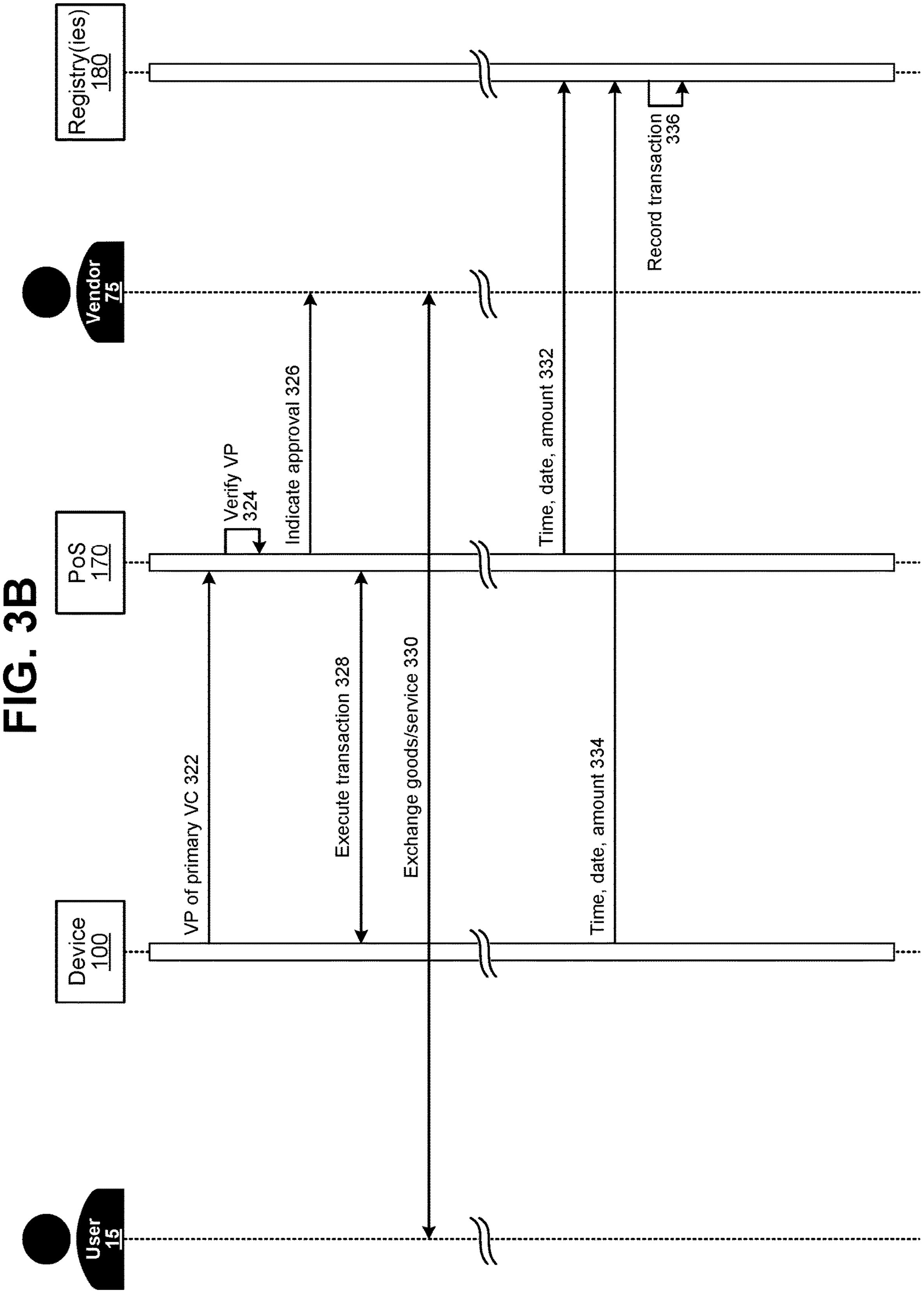

FIGS. 3A and 3B are signal-flow diagrams illustrating example operations of a financial transaction, according to embodiments of the present disclosure. In some use cases, the user 15 may use their digital credentials to receive disbursements from the organization and/or to use a cryptocurrency such as Stablecoin. Cryptocurrency is an electronic form of money that individuals can receive and spend electronically. In contrast to government-issued currencies, cryptocurrency may not rely on a central authority to uphold or maintain it. Rather, records of ownership and/or transactions may be stored in a distributed ledger such as a blockchain. In some implementations, the use of digital credentials may establish trust between the parties (e.g., the user 15 and a vendor 75) that enables them to execute a transaction even if one or both of their respective devices lacks a network connection such as would be used to, for example, check a bank balance or credit card validity/limit.

If the user 15 has received cryptocurrency funds, the operations may include, at step 302, updating the registry(ies) 180 to reflect the user's received funds and/or new balance. In some implementations, the vendor 75 may, at step 304, occasionally or periodically download a current allowlist from the registry(ies) 180 to the PoS 170 so that the PoS 170 can verify whether an offered digital credential is still valid as of the latest downloaded allowlist.

At step 306, the user 15 may request a disbursement or purchase from a vendor 75. In various use cases, the vendor 75 and/or PoS 170 may represent an office of the organization, a bank, a currency exchange kiosk, a store, etc. The vendor 75 may, at step 308, enter the request or sale into the PoS 170. For example, the vendor 75 may input into the PoS 170 that the user 15 is requesting a disbursement of funds granted to him or her by the organization in connection with an attribute recorded in the user's digital credential. In another example, the vendor 75 may input into the PoS 170 that the user 15 is requesting goods or services to be paid for at the time of sale or later based on a settling of accounts once one or both parties are able to upload a record of the transaction.

At step 310, the PoS 170 may prompt the user for authentication. For example, the PoS 170 may display a QR code with information on how to provide a VP of the digital credential. The user 15 can scan the QR code with their wallet 120, and the wallet 120 may generate and the VP using the TEE and the requested credential, and send it to a verifier system. In another example, the vender 75 may use the PoS 170 to scan the user device 100, which may provide the VP via a displayed QR code or wirelessly via, for example, NFC.

At step 312, the user 15 may select their primary digital credential to execute the transaction. Because the digital credential corresponds to a cryptographic key that is linked to the biometric template, the user device 100 may, at step 314, prompt the user 15 for their biometric identification. The user 15 may, at step 316, provide a biometric input. At step 318, the user device 100 may attempt to verify that the biometric input matches the biometric template linked to cryptographic key pair corresponding to the selected digital credential. If so, the user device 100 may, at step 320, use the biometric-linked private key to digitally sign the VC and generate a VP. In some implementations, the wallet 120 may be able to selectively disclose attributes represented in a digital credential. For example, when the user selects a VC for payment at step 312, the user may select which claim or claims of the VC to disclose to the PoS 170. For example, the user 15 may instruct the wallet 120 to share an attribute that proves the user 15 is entitled to a certain spending limit or disbursement of funds, while withholding the user's identity. At step 322, the user device 100 may send the VP to the PoS 170.

The operations may continue in FIG. 3B. At step 324, the PoS 170 may verify the VP. For example, the PoS 170 may extract the public key from the VP and use it to determine whether the VP was digitally signed using the corresponding private key (i.e., the biometric-linked private key). In some implementations, the PoS 170 or the user device 100 may send the VP to the verifier system 140 for verification. Upon verification, of the VP, the verifier system 140 may return a verification result to the PoS 170. In some implementations, the verifier system 140 and/or the PoS 170 may additionally use the allowlist to determine whether the VC embodied in the VP is currently valid. Upon verification of the VP, the PoS 170 may, at step 326, indicate approval to the vendor 75. The PoS 170 and the user device 100 may, at step 328, execute the electronic aspects of the transaction (e.g., confirming details of the transaction including the time, date, amount, items exchange; digitally signing a record of the transaction with their private key, etc.). If the transaction involves an exchange of services and/or tangible goods, the user 15 and the vendor 75 may, at step 330, exchange them upon their respective devices confirming the transaction.

In some cases, one or both of the parties may lack a network connection at the time of the transaction. In such cases, the user device 100 and/or the PoS 170 may store a record of the transaction, and one or both of the devices may upload the record to the registry(ies) 180 at a later time (e.g., at steps 332 and/or 334). At step 336, the registry(ies) 180 may record the transaction in a distributed ledger. In some cases, the parties need not record any private information such as identities in the records. Rather, the record may be limited to the time, date, and amount of the transaction. In some implementations, the records uploaded at steps 332 and 334 may be used to settle accounts; for example, by a payment service acknowledging the use of funds by the user 15 (e.g., similar to a credit card payment). In some implementations, the records uploaded at steps 332 and 334 may be used by the organization to track disbursements to the user 15. In some implementations, the records uploaded at steps 332 and 334 may go to a third-party organization that provides funds to pay for a service on behalf of the user 15.

Figure 4A:
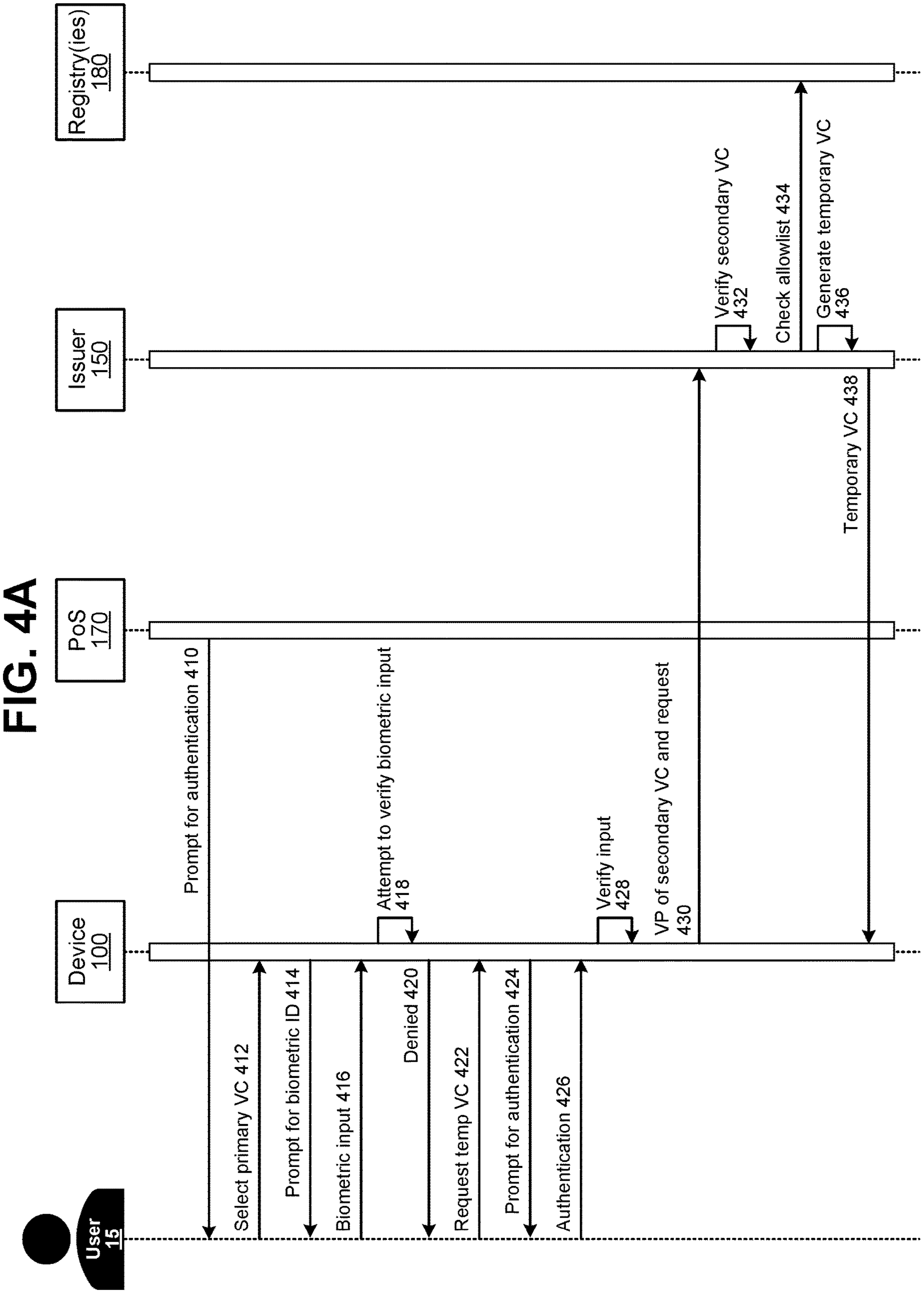
FIGS. 4A and 4B are signal-flow diagrams illustrating example operations of using a secondary credential to conduct a financial transaction, according to embodiments of the present disclosure.
Figure 4B:
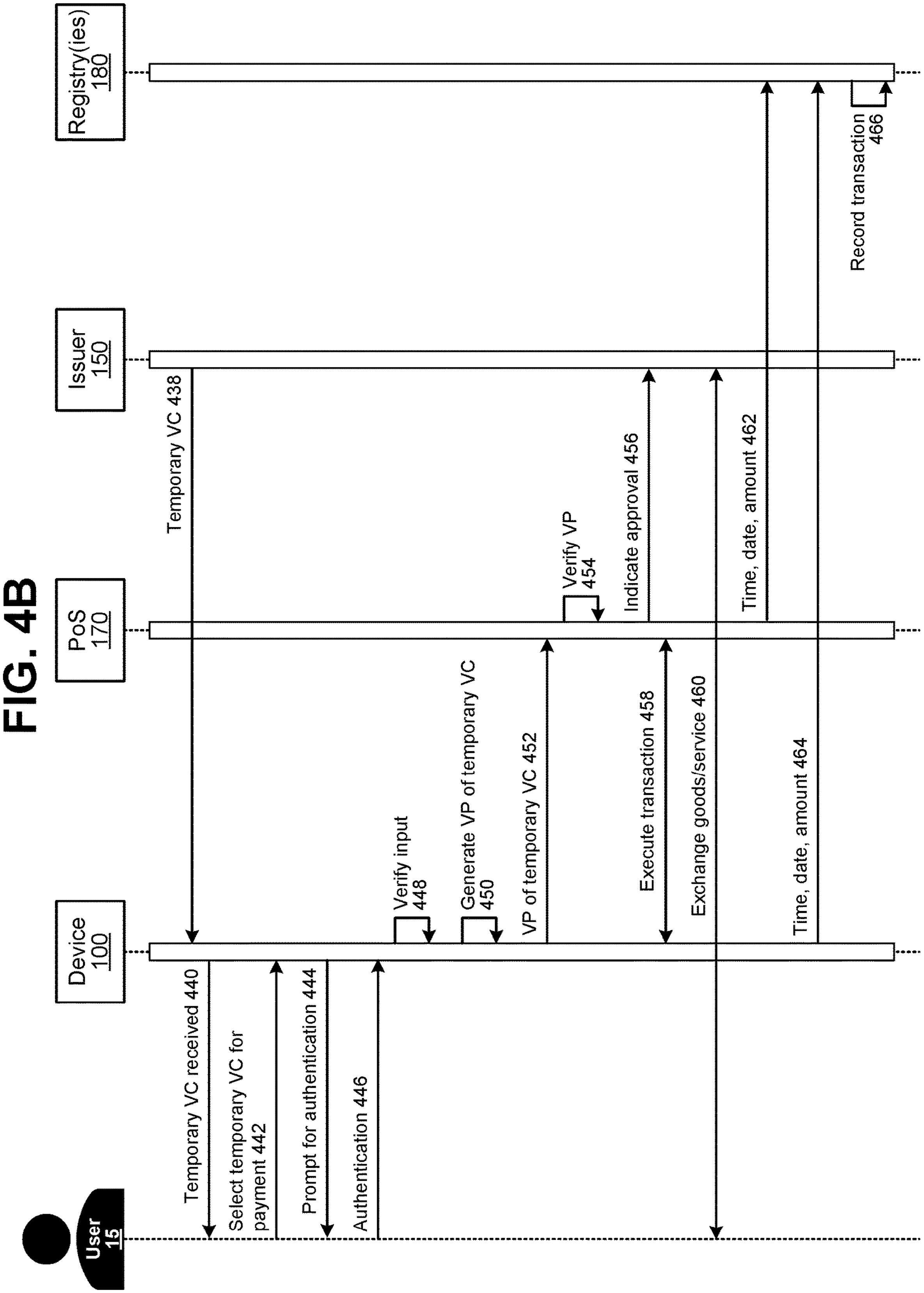

FIGS. 4A and 4B are signal-flow diagrams illustrating example operations of using a secondary credential to conduct a financial transaction, according to embodiments of the present disclosure. If the primary digital credential is unavailable to the user 15, the user 15 may use their secondary digital credential to obtain a temporary digital credential that will give the user 15 temporary and/or limited authorization to access a resource system or execute a transaction.

The user 15 and vendor 75 may initiate the transaction, for example, using steps similar to steps 302 to 308 described above. At step 410, the PoS 170 may prompt the user 15 for authentication. If, however, the user 15 knows that the primary digital credential is unavailable—for example, because they have changed their user device and/or biometric identification since generating the cryptographic key pair used to register the primary digital credential—steps 412 through 420 may be skipped, and the user 15 may proceed with using the secondary digital credential to obtain a temporary digital credential. If the user 15 attempts to use their primary digital credential for payment, the operations may include steps 412 through 416, which may be similar to steps 312 through 316 described above. At step 418, the user device 100 may attempt to verify the biometric input received at step 416 against the biometric template linked to the cryptographic key pair corresponding to the primary digital credential. If the user device 100 cannot determine a match between the biometric input and the biometric template, either because the input differs from the template or the template has been replaced, the user device 100 may, at step 420, return a notification that the request to use the primary digital credential is denied. In some cases, the original biometric template (e.g., the one linked to the cryptographic key corresponding to the digital credential) may have been replaced with a new biometric template. The user device 100 may determine a match between the biometric input received at step 416 and the new biometric template and, as a result, sign a VP using a cryptographic key linked to the new biometric template. If the verifier system 140 and/or the trusted issuer system 150 receive that VP, they may determine that the digital signature does not match the public key in the VP, and thus deny the request. The user 15 may be notified that their VP could not be verified, and the user may proceed to step 422 to use their secondary digital credential instead.

At step 422, the user 15 may enter a request into the user device 100 to obtain a temporary digital credential. At step 424, the user device 100 may prompt the user to authenticate the request. For example, the wallet 120 and/or the TEE 110 may require authentication to use the secondary digital credential to obtain the temporary digital credential from the trusted issuer system 150. In some cases, the authentication need not conform to a specific biometric template. For example, the user 15 may, at step 426, authenticate themselves using a PIN, password, and/or a biometric input corresponding to a biometric template different from the one linked to the primary digital credential. At step 428, the user device 100 may verify the input. If the user device 100 verifies the user's authentication, the user device 100 may, at step 430, send a request for the temporary digital credential to the trusted issuer system 150 along with the secondary digital credential or a VP representing it the secondary digital credential.

At step 432, the trusted issuer system 150 may verify the request and the secondary VC/VP. In some implementations, the trusted issuer system 150 may, at step 434, check the allowlist stored in the registry 180 to determine whether the user 15 still has a valid credential. This may give the system an added layer of security in the event that a user attempts to use their secondary digital credential when their primary digital credential is revoked, rather than simply unavailable. If the trusted issuer system 150 determines that the request and secondary digital credential are valid, the trusted issuer system may, at step 436, generate the temporary digital credential, and return it to the user device 100 at step 438.

The operations may continue in FIG. 4B. At step 440, the user device 100 may output an indication to the user 15 that the user device 100 has received the temporary digital credential. At step 442, the user 15 may select the temporary digital credential to execute the transaction. At step 444, the user device 100 may prompt the user 15 for authentication. The user 15 may, at step 446, authenticate themselves using one or more of the means recognized by the wallet 120 (e.g., a biometric input, PIN, password, etc.). At step 448, the user device 100 may verify the input. If the user device 100 verifies the user's authentication, the user device 100 may, at step 450, generate a VP of the temporary digital credential; for example, by applying a digital signature to a copy of the temporary digital credential using the private key corresponding to the public key in represented in the digital credential. At step 452, the user device 100 may send the VP of the temporary digital credential to the PoS 170.

At step 454, the PoS 170 or the verifier system 140 may verify the VP of the temporary digital credential. This verification may include checking keys and signatures in the VP. For example, the PoS 170 or the verifier system 140 may extract the public key from the VP and use it to determine whether the VP was digitally signed using the corresponding private key. In some implementations, the PoS 170 or the verifier system 140 may additionally check the allowlist and/or with the trusted issuer system 150 to determine whether the temporary digital credential is valid. Upon verification of the VP, the PoS 170 may, at step 456, indicate approval to the vendor 75. The PoS 170 and the user device 100 may, at step 458, execute the electronic aspects of the transaction (e.g., confirming details of the transaction including the time, date, amount, items exchange; digitally signing a record of the transaction with their private key, etc.). If the transaction involves an exchange of services and/or tangible goods, the user 15 and the vendor 75 may, at step 460, exchange them upon their respective devices confirming the transaction.

In some cases, one or both of the parties may lack a network connection at the time of the transaction. In such cases, the user device 100 and/or the PoS 170 may store a record of the transaction, and one or both of the devices may upload the record to the registry(ies) 180 at a later time (e.g., at steps 462 and/or 464). At step 466, the registry(ies) 180 may record the transaction in a distributed ledger. In some cases, the parties need not record any private information such as identities in the records. Rather, the record may be limited to the time, date, and amount of the transaction. In some implementations, the records uploaded at steps 462 and 464 may be used to settle accounts; for example, by a payment service acknowledging the use of funds by the user 15 (e.g., similar to a credit card payment). In some implementations, the records uploaded at steps 462 and 464 may be used by the organization to track disbursements to the user 15. In some implementations, the records uploaded at steps 462 and 464 may go to a third-party organization that provides funds to pay for a service on behalf of the user 15.

Figure 5A:
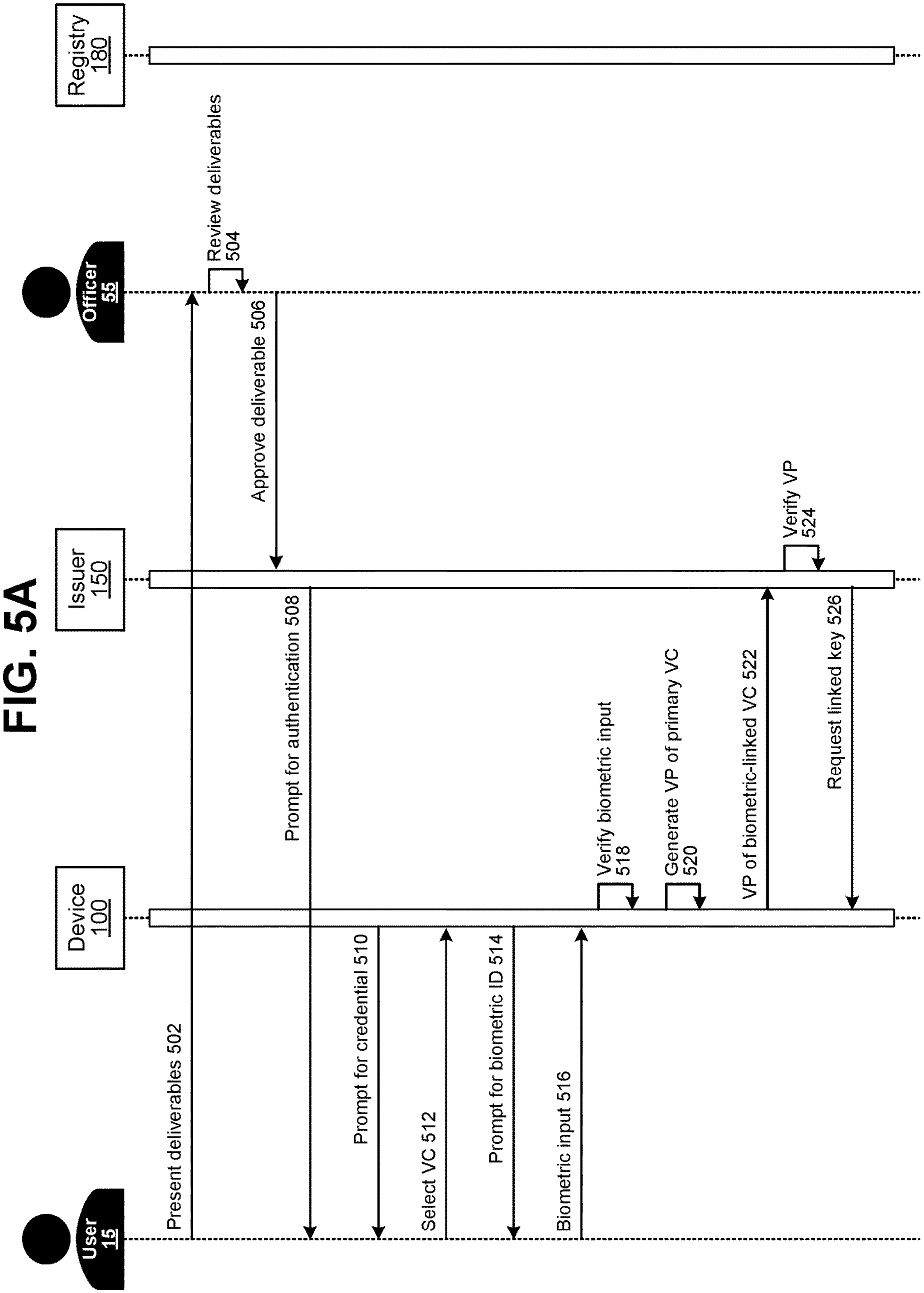
FIGS. 5A and 5B are signal-flow diagrams illustrating example operations for obtaining a new credential with an added attribute, according to embodiments of the present disclosure.
Figure 5B:
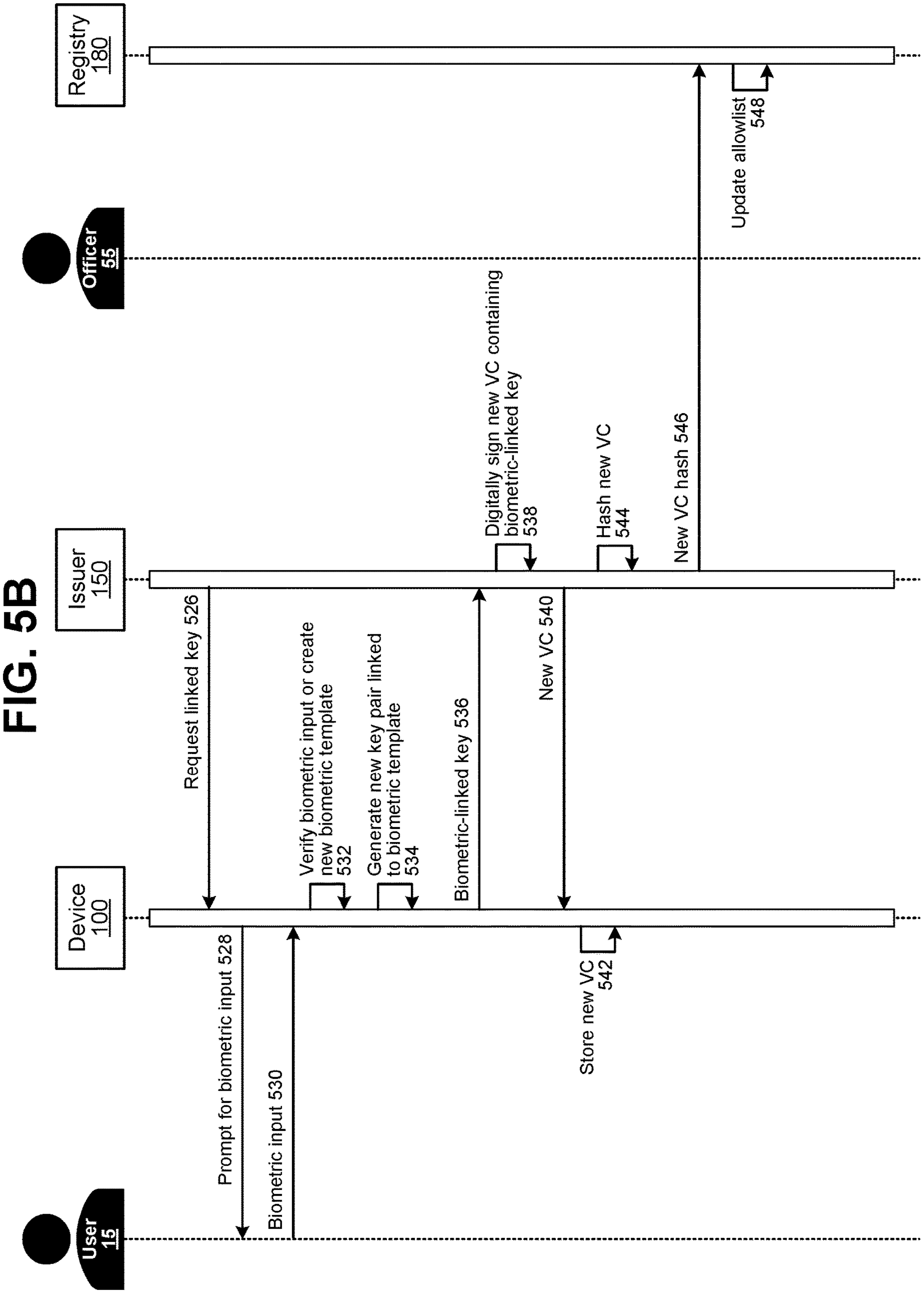

FIGS. 5A and 5B are signal-flow diagrams illustrating example operations for obtaining a new credential with an added attribute, according to embodiments of the present disclosure. For example, the user may complete an educational course to earn a degree, obtain citizenship, start a new position within an organization, etc. The user 15 may establish the attribute by presenting deliverables (e.g., physical and/or electronic documents establishing the attribute) to the officer 55 at step 502. The office 55 may review the deliverables at step 504 and, if everything is in order, enter their approval into the trusted issuer system at step 506.

In some cases, the user 15 may use their digital credential to establish their identity within the system, as illustrated in steps 508 through 524. At step 508, the trusted issuer system 150 (e.g., via the same or different system device 800 used to provide the digital credential) may prompt the user 15 for authentication. At step 510, the user device 100 may prompt the user 15 to select a digital credential for responding to the request for authentication. At step 512, the user may select a digital credential (e.g., the biometric-linked primary digital credential). At step 514, the user device 100 may prompt the user for their biometric identification. The user 15 may provide their biometric input at step 516. At step 518, the user device 100 (e.g., using the TEE 110) may verify the biometric input against the biometric template linked to the cryptographic key corresponding to the selected digital credential. If the user device 100 verifies a match, the user device 100 may, at step 520, sign the digital credential using the biometric linked cryptographic key to generate a VP. At step 522, the user device 100 may send the VP to the trusted issuer system 150 for verification. At step 524, the trusted issuer system 150 (or, in some cases, a verifier system 140 associated with the trusted issuer system 150) may verify the VP or receive an indication from the verifier system that the VP was verified.

In some cases, the user's identity may already be established in the system, and the operations may skip some or all of steps 508 through 524. In either case, the operations may continue with step 526, in which the trusted issuer system 150 requests a new cryptographic key linked to a biometric template. Alternatively, if the same cryptographic keys and biometric template are to be reused for the new digital credentials, the operations may continue to step 538, in which the trusted issuer system 150 generates a new digital credential using the existing biometric-linked cryptographic key.

The operations may continue on FIG. 5B. The steps 528 through 542 may be the same as or similar to steps 216 to 230 that were performed to create the original digital credential. If the existing biometric template and linked cryptographic key are to be reused, the user device 100 may receive the biometric input at step 530, and verify it against the existing biometric template at step 532. At step 534, the user device 100 may generate a new cryptographic key pair linked to the biometric template. If an existing linked key is to be used, step 534 may be skipped. In either case, the user device 100 may, at step 536, send the biometric linked public key to the trusted issuer system 150.

If the user 15 wishes to enroll a new biometric identification, the user device 100 may, at step 532, use the biometric input received at step 530 to create a new biometric template. At step 534, the user device may generate a new cryptographic key pair that is linked to the new biometric template. At step 536, the user device 100 may send the biometric-linked public key to the trusted issuer system 150.

In some implementations, the trusted issuer system 150 may generate a hash of the new digital credential and update the allowlist in the registry 180 in step 544 through 548, which may be the same as or similar to step 232 through 236.

Figure 6:
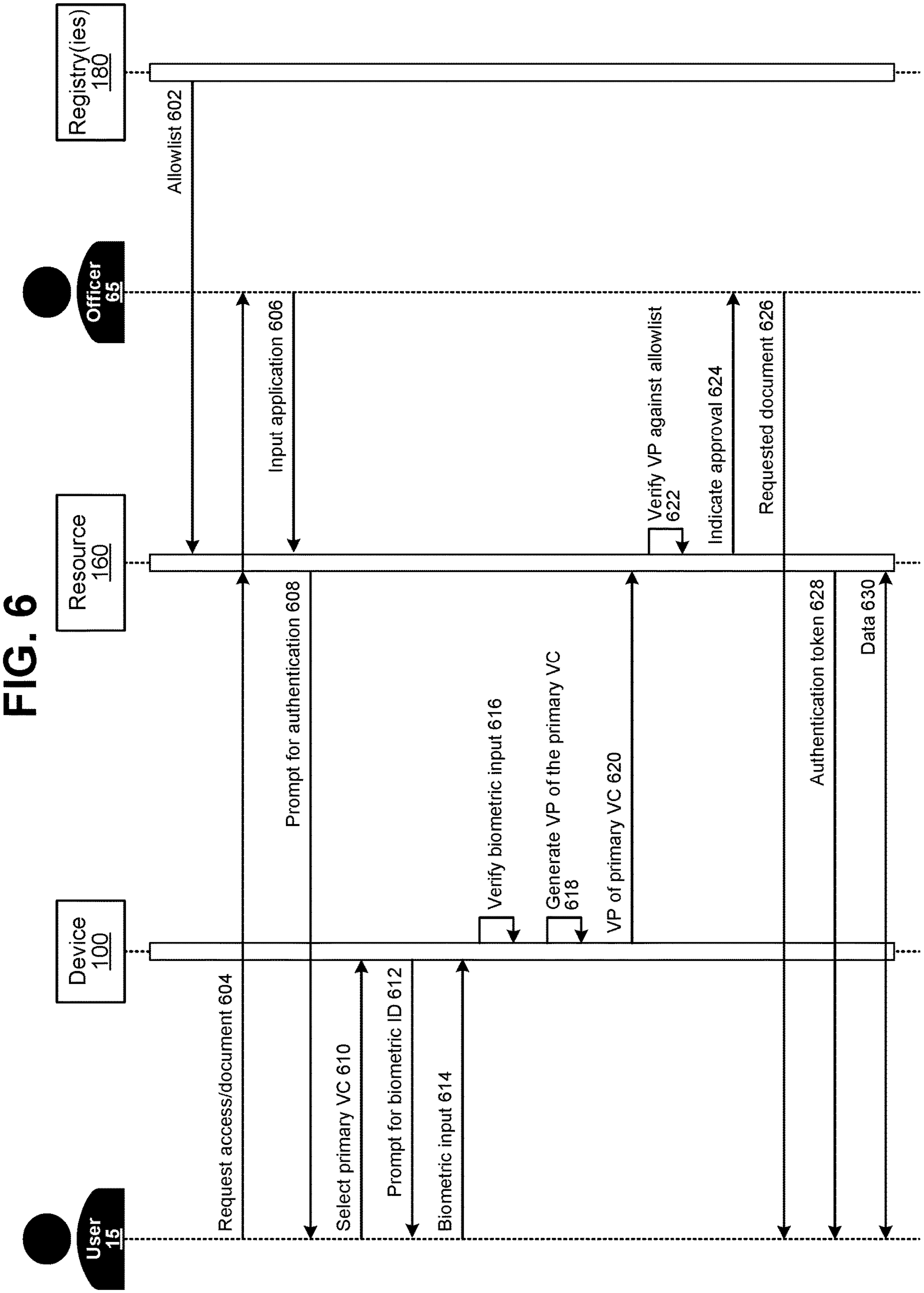
FIG. 6 is a signal-flow diagram illustrating example operations for using a digital credential to access a resource and/or obtain documentation, according to embodiments of the present disclosure.

FIG. 6 is a signal-flow diagram illustrating example operations for using a digital credential to access a resource and/or obtain documentation, according to embodiments of the present disclosure. For example, the local agency may host a resource system 160. In some cases, the user 15 may request access to the resource system 160 using their digital credential. In some cases, the user 15 may apply to the local agency to obtain documentation such as a permit, official records, etc., and an officer 65 may use the resource system 160 to verify the user's digital credentials and/or to produce the requested data and/or document 175.

In some implementations, the officer 65 may, at step 602, occasionally or periodically download a current allowlist from the registry(ies) 180 to the resource system 160 so that the resource system 160 can verify whether an digital credential offered by the user 15 is still valid as of the latest downloaded allowlist.

At step 604, the user 15 may appear at the local agency to submit a request a document and/or access to a computer system. For example, the user may submit the request electronically using the resource system 160 and/or physically by meeting with the officer 65 and authenticating themselves under the observation of the officer 65 (e.g., by demonstrating to the officer 65 that the user 15 can pass the user device's biometric authentication). This may provide assurance that the subsequently generated cryptographic key pair is linked to that biometric template, and thus the user 15.

At step 606, the officer 65 may input the user's application into the resource system 160. At step 608, the resource system 160 may prompt the user for authentication. For example, the resource system 160 may display a QR code with information on how to provide a VP of the digital credential. The user 15 can scan the QR code with their wallet 120, and the wallet 120 may generate and the VP using the TEE 110 and the requested credential, and send it to a verifier system. In another example, the officer 65 may use the resource system 160 to scan the user device 100, which may provide the VP via a displayed QR code or wirelessly via, for example, NFC.

At step 610, the user 15 may select their primary digital credential to execute the transaction. Because the digital credential is linked to the biometric template, the user device 100 may, at step 612, prompt the user 15 for their biometric identification. The user 15 may, at step 614, provide a biometric input. At step 616, the user device 100 may attempt to verify that the biometric input matches the biometric template linked to the cryptographic key corresponding to the selected digital credential. If so, the user device 100 may, at step 618, use the biometric-linked private key and the primary digital credential to generate a VP. In some implementations, the wallet 120 may selectively disclose attributes represented in a digital credential. For example, when the user selects a VC for access at step 610, the user 15 may select which claim or claims of the VC to disclose to the resource system 160. For example, the user 15 may instruct the wallet 120 to share the user's identity within the organization, while withholding other information such as the user's address or bank accounts. At step 620, the user device 100 may send the VP of the primary digital credential to the resource system 160.

At step 622, the resource system 160 (and/or a verifier system 140) may verify the VP. For example, the resource system 160 or verifier system 140 may extract the public key from the VP and use it to determine whether the VP was digitally signed using the corresponding private key. In some implementations, the resource system 160 or verifier system 140 may additionally use the allowlist to determine whether the VC embodied in the VP is currently valid. Upon verification of the VP, the resource system 160 may, at step 624, indicate approval to the officer 65. If the user 15 requested a document 175, the officer 65 may, at step 626, produce the document 175 and give it to the user 15.

If the user 15 requested access to the resource system 160, the operations may include, at step 628, providing the user device 100 (or another user device belonging to the user 15) an authentication token 165 enabling the user device to access a resource system 160 for a period of time without having to repeat the registration process. For example, the user device may include a client application such as a web browser. At step 630, the user 15 may use the client application to request access to a resource hosted by the resource system 160 to, for example, exchange and/or retrieve data 175 using the resource system 160. Following registration/login, a session (e.g., an OpenID Connect session) may be established with the client application, allowing it to access the resource system 160. The client application may receive an authentication token 165 corresponding to the session. In some implementations, the authentication token 165 may be an access token with an expiration date. The authentication token may or may not include a data payload. In some cases, the authentication token 165 may simply be a random string of characters that is digitally signed by the entity who issued the token. In some cases, the authentication token 165 may be a JSON Web Token (JWT). JSON is an open standard file format that may use human-readable text to store and transmit data. A JWT is a proposed Internet standard for creating data with a JSON payload, with optional encryption and/or digital signature. A JWT may encode data such as "claims," which may correspond to user attributes, permissions, etc. If the JWT includes a digital signature, a verifier may use the public key of the signer (who may be the trusted issuer system 150, the resource system 160, or another entity) to verify the claims. In some cases, the client application may store the authentication token 165 in the local storage of the user device 100 on which the client application is executing. In some cases, the client application may hold an encrypted HTTP-only session cookie while the resource system 160 holds the corresponding JWT.

Figure 7A:
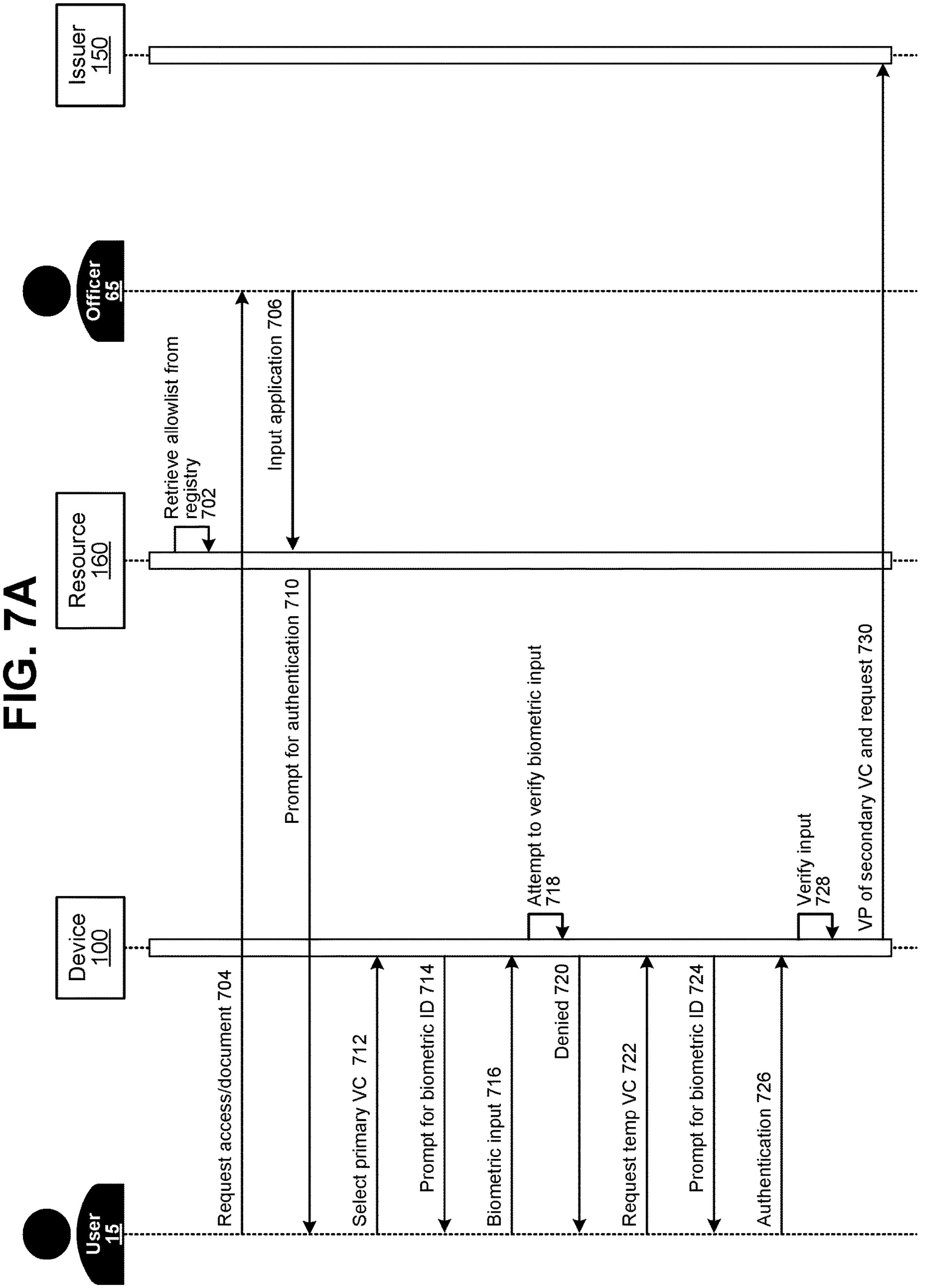
FIGS. 7A and 7B are signal-flow diagrams illustrating example operations for registering with a local agency using a secondary credential, according to embodiments of the present disclosure.
Figure 7B:
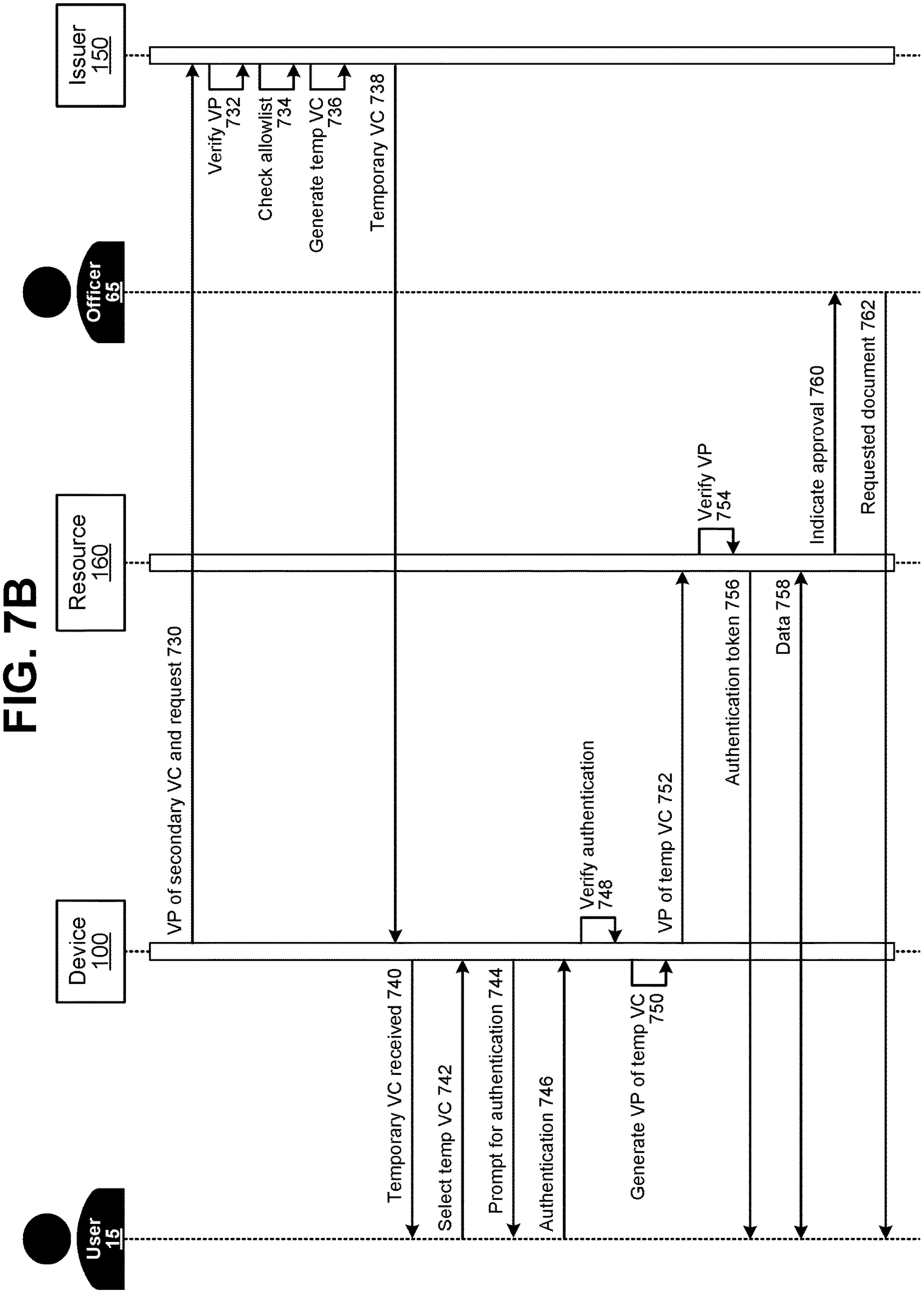

FIGS. 7A and 7B are signal-flow diagrams illustrating example operations for registering with a local agency using a secondary credential, according to embodiments of the present disclosure. In FIG. 7A, the steps 702 through 718 may be the same as or similar to the steps 602 to 616 illustrated in FIG. 6, with the user 15 selecting their primary digital credential at step 710. At step 718, however, the user device 100 may attempt to verify the biometric input received at step 716 against the biometric template linked to the cryptographic key corresponding to the primary digital credential, and determine that they do not match. If the user device 100 does not or cannot determine a match between the biometric input and the biometric template, either because the input differs from the template or the template has been replaced, the user device 100 may, at step 720, return a notification that the request to use the primary digital credential is denied. If, however, the user 15 knows that the primary digital credential is unavailable—for example, because they have changed their user device and/or biometric identification since registering the primary digital credential—steps 712 through 720 may be skipped, and the user 15 may proceed with using the secondary digital credential to obtain a temporary digital credential.

At step 722, the user 15 may enter a request into the user device 100 to obtain a temporary digital credential. At step 724, the user device 100 may prompt the user to authenticate the request. For example, the wallet 120 and/or the TEE 110 may require authentication to use the secondary digital credential to obtain the temporary digital credential from the trusted issuer system 150. In some cases, the authentication need not conform to a specific biometric template. For example, the user 15 may, at step 726, authenticate themselves using a PIN, password, and/or a biometric input corresponding to a biometric template different from the one linked to the primary digital credential. At step 728, the user device 100 may verify the input. If the user device 100 verifies the user's authentication, the user device 100 may, at step 730, send a VP representing it the secondary digital credential along with a request for a temporary digital credential to the trusted issuer system 150.

The operations may continue in FIG. 7B. At step 732, the trusted issuer system 150 may verify the VP of the secondary VC. In some implementations, the trusted issuer system 150 may, at step 734, check the allowlist stored in the registry 180 to determine whether the user 15 still has a valid credential. This may give the system an added layer of security in the event that a user attempts to use their secondary digital credential when their primary digital credential is revoked, rather than simply unavailable. If the trusted issuer system 150 determines that the request and secondary digital credential are valid, the trusted issuer system may grant the request and, at step 736, generate the temporary digital credential, and return it to the user device 100 at step 738.

At step 740, the user device 100 may output an indication to the user 15 that the user device 100 has received the temporary digital credential. At step 742, the user 15 may select the temporary digital credential to execute the transaction. At step 744, the user device 100 may prompt the user 15 for authentication. The user 15 may, at step 746, authenticate themselves using one or more of the means recognized by the wallet 120 (e.g., a biometric input, PIN, password, etc.). At step 748, the user device 100 may verify the input. If the user device 100 verifies the user's authentication, the user device 100 may, at step 750, generate a VP of the temporary digital credential; for example, by applying a digital signature to a copy of the temporary digital credential using the private key corresponding to the public key in represented in the digital credential. At step 752, the user device 100 may send the VP of the temporary digital credential to the resource system 160.

At step 754, the resource system 160 (or a verifier system 160) may verify the VP of the temporary digital credential. This verification may include checking keys and signatures in the VP. For example, the resource system 160 or verifier system 160 may extract the public key from the VP and use it to determine whether the VP was digitally signed using the corresponding private key. In some implementations, the resource system 160 or verifier system 160 may additionally check the allowlist and/or with the trusted issuer system 150 to determine whether the temporary digital credential is valid.

Upon verification of the VP, if the user 15 requested access to the resource system 160, the operations may include, at step 756, providing the user device 100 (or another user device belonging to the user 15) an authentication token 165 enabling the user device to access a resource system 160 for a period of time without having to repeat the registration process. For example, the user device may include a client application such as a web browser. At step 758, the user 15 may use the client application and authentication token 165 to request access to a resource hosted by the resource system 160 to, for example, exchange and/or retrieve data 175. In some cases, the authentication token 165 may expire sooner than an authentication token granted for a primary digital credential and/or may correspond to more restricted access within the resource system 160 (e.g., the ability to read but not modify data).

If the user 15 requested a document, the resource system 160 may, at step 760, indicate approval to the officer 65. the officer 65 may, at step 762, produce the document 175 and give it to the user 15.

Figure 8:
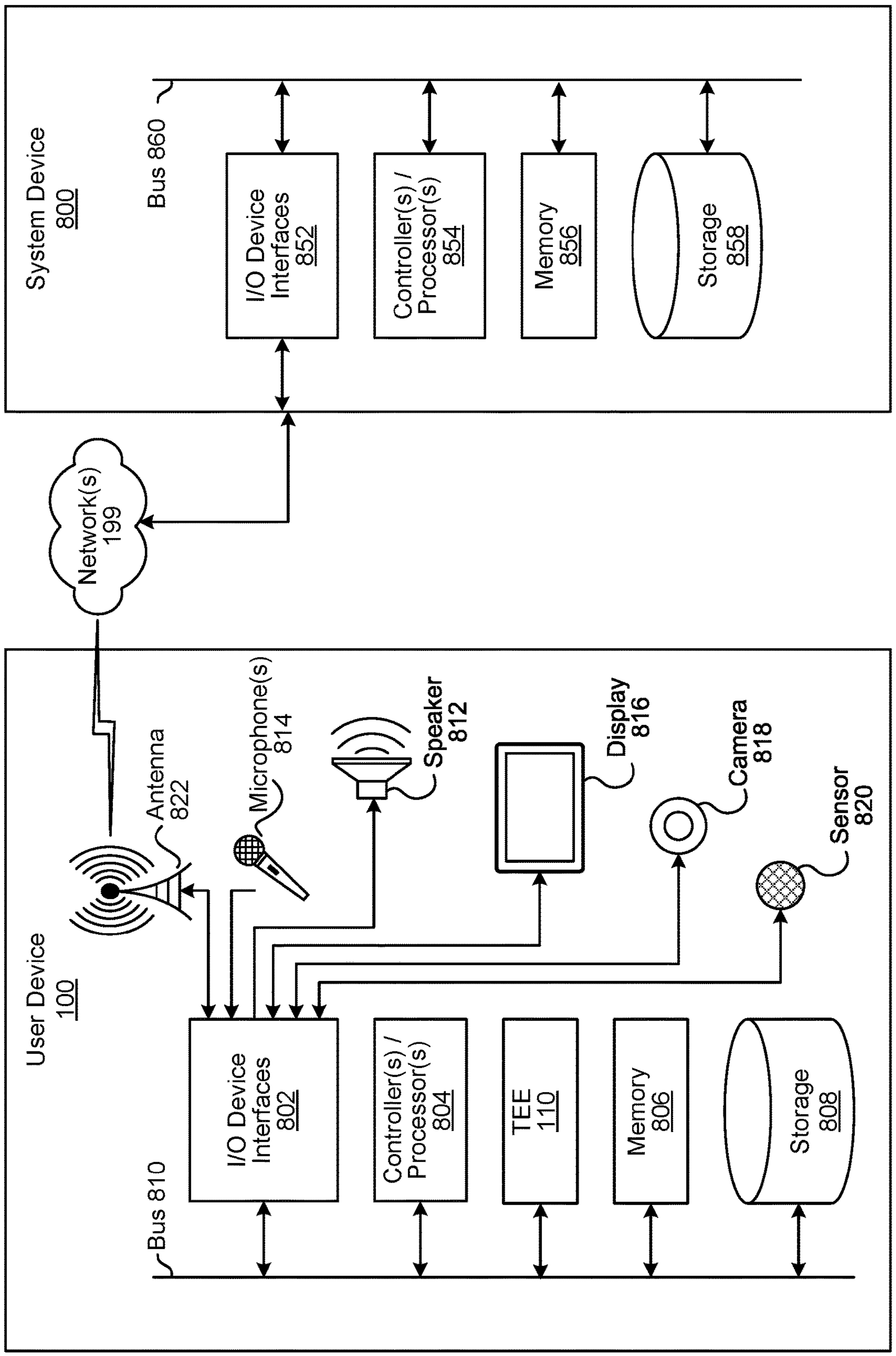
FIG. 8 is a conceptual diagram illustrating components of an example user device and an example system device, according to embodiments of the present disclosure.

FIG. 8 is a conceptual diagram illustrating components of an example user device 100 and an example system device 800 communicating over a computer network 199, according to embodiments of the present disclosure. While the user device 100 may operate locally to a user (e.g., within a same environment so the device may receive inputs and playback outputs for the requestor) the system device(s) 800 may be located remotely from the user device 100. The system device(s) 800 may be located in an entirely different location from the user device 100 (for example, as part of a cloud computing system or the like).

The user device 100 may include one or more controllers/processors 804, which may each include a central processing unit (CPU) for processing data and computer-readable instructions, and a memory 806 for storing data and instructions of the respective device. The memories 806 may individually include volatile random-access memory (RAM), non-volatile read only memory (ROM), non-volatile magnetoresistive memory (MRAM), and/or other types of memory. User device 100 may also include a data storage component 808 for storing data and controller/processor-executable instructions. Each data storage component 808 may individually include one or more non-volatile storage types such as magnetic storage, optical storage, solid-state storage, etc. User device 100 may also be connected to removable or external non-volatile memory and/or storage (such as a removable memory card, memory key drive, networked storage, etc.) through respective input/output device interfaces 802.

Computer instructions for operating user device 100 and its various components may be executed by the respective device's controller(s)/processor(s) 804, using the memory 806 as temporary "working" storage at runtime. A device's computer instructions may be stored in a non-transitory manner in non-volatile memory 806, data storage component 808, or an external device(s). Alternatively, some or all of the executable instructions may be embedded in hardware or firmware on the respective device in addition to or instead of software.

In some implementations, the user device 100 may include a TEE 110 as previously described. In some implementations, the TEE 110 may be separate and secure portions of the controller(s)/processor(s) 804, memory 806, and/or data storage component 808. In some implementations, the TEE 110 may have its own dedicated and secure controller(s)/processor(s), memory, and/or storage.

User device 100 includes input/output device interfaces 802. A variety of components may be connected through the input/output device interfaces 802, as will be discussed further below. Additionally, user device 100 may include an address/data bus 810 for conveying data among components of the respective device. Each component within a user device 100 may also be directly connected to other components in addition to (or instead of) being connected to other components across the bus 810.

The user device 100 may include input/output device interfaces 802 that connect to a variety of components such as an audio output component such as a speaker 812, a wired headset or a wireless headset (not illustrated), or other component capable of outputting audio. The user device 100 may also include an audio capture component. The audio capture component may be, for example, a microphone 814 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The user device 100 may additionally include a display 816 for displaying content. The user device 100 may further include a camera 818 and/or sensor 820. In addition to capturing image data, the camera 818 and the sensor 820 may receive biometric inputs to, for example, enroll a biometric identification or approve a request or operation requiring heightened authentication. The sensor 820 may be a single- or multi-mode device that can incorporate one or more of an ultrasonic fingerprint scanner, capacitive or CMOS scanner, optical scanner, and/or thermal scanner, etc.

Via antenna(s) 822, the input/output device interfaces 802 may connect to one or more computer networks 199 via a wireless local area network (WLAN) (such as Wi-Fi) radio, Bluetooth, and/or wireless network radio, such as a radio capable of communication with a wireless communication network such as a Long-Term Evolution (LTE) network, WiMAX network, 3G network, 4G network, 5G network, etc. A wired connection such as Ethernet may also be supported. Through the network(s) 199, the system may be distributed across a networked environment. The I/O device interface 802 may also include communication components that allow data to be exchanged between devices such as different physical servers in a collection of servers or other components.

The system device 800 may include one or more physical devices and/or one or more virtual devices, such as virtual systems that run in a cloud server or similar environment. The system device 800 may include one or more input/output device interfaces 852 and controllers/processors 854. The system device 800 may further include a memory 856 and storage 858. A bus 860 may allow the input/output device interfaces 852, controllers/processors 854, memory 856, and storage 858 to communicate with each other; the components may instead or in addition be directly connected to each other or be connected via a different bus.

A variety of components may be connected through the input/output device interfaces 852. For example, the input/output device interfaces 852 may be used to connect to the computer network 199. Further components include keyboards, mice, displays, touchscreens, microphones, speakers, and any other type of user input/output device. The components may further include USB drives, removable hard drives, or any other type of removable storage.

The controllers/processors 854 may process data and computer-readable instructions and may include a general-purpose central-processing unit, a specific-purpose processor such as a graphics processor, a digital-signal processor, an application-specific integrated circuit, a microcontroller, or any other type of controller or processor. The memory 856 may include volatile random-access memory (RAM), non-volatile read only memory (ROM), non-volatile magnetoresistive (MRAM), and/or other types of memory. The memory 856 may be used for storing data and controller/processor-executable instructions on one or more non-volatile storage types, such as magnetic storage, optical storage, solid-state storage, etc.

Computer instructions for operating the system device 800 and its various components may be executed by the controller(s)/processor(s) 854 using the memory 856 as temporary "working" storage at runtime. The computer instructions may be stored in a non-transitory manner in the memory 856, storage 858, and/or an external device(s). Alternatively, some or all of the executable instructions may be embedded in hardware or firmware on the respective device in addition to or instead of software.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and data processing should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the modules and engines may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:

sending, from a user device to a trusted issuer system, a first request for a first digital credential;

receiving, in response to the first request, a second request for a first biometric-linked cryptographic key;

creating, using a trusted execution environment (TEE) of the user device, a first biometric-linked cryptographic key pair including a first private key and a first public key, the TEE conditioning use of the first private key on confirming that a received biometric input matches a first biometric template;

sending the first public key to the trusted issuer system; and receiving the first digital credential from the trusted issuer system, the first digital credential including the first public key and a first digital signature of the trusted issuer system.

2. The computer-implemented method of claim 1, further comprising:

receiving a third request to generate a verifiable presentation (VP);

outputting a first prompt for biometric input;

receiving a first biometric input;

determining, using the TEE, that the first biometric input matches the first biometric template; and receiving, from the TEE in response to the TEE determining that the first biometric input matches the first biometric template, the VP representing the first digital credential and a second digital signature corresponding to the first private key.

3. The computer-implemented method of claim 1, further comprising:

receiving, from a second device, a request for payment for executing a transaction;

receiving a first biometric input;

determining, using the TEE, that the first biometric input matches the first biometric template;

receiving, from the TEE in response to the TEE determining that the first biometric input matches the first biometric template, a verifiable presentation (VP) representing the first digital credential and a second digital signature corresponding to the first private key;

sending the VP to at least one of the second device or a third device associated with the second device;

receiving an indication that the VP has been verified; and in response to receiving the indication, executing the transaction with the second device.

4. The computer-implemented method of claim 1, further comprising:

creating a second cryptographic key pair including a second private key and a second public key, wherein the user device does not condition use of the second private key on confirming that a received biometric input matches the first biometric template;

sending the second public key to the trusted issuer system; and receiving a second digital credential from the trusted issuer system, the second digital credential including the second public key and a second digital signature of the trusted issuer system.

5. The computer-implemented method of claim 4, further comprising:

determining that the first private key is unavailable;

sending, to the trusted issuer system, a third request for a third digital credential;

receiving a fourth request for a first verifiable presentation (VP);

creating, using the second private key and the second digital credential, the first VP;

sending the first VP to at least one of the trusted issuer system or a verifier system for verification; and receiving, from the trusted issuer system in response to verification of the first VP, the third digital credential.

6. The computer-implemented method of claim 5, further comprising:

receiving, from a second device, a request for payment for executing a transaction;

creating, using the third digital credential, a second VP;

submitting the second VP for verification;

receiving an indication that the second VP has been verified; and in response to receiving the indication, executing the transaction with the second device.

7. The computer-implemented method of claim 5, further comprising:

sending a request for access to a resource system;

receiving a request for a second VP;

creating, using the third digital credential, the second VP;

submitting the second VP for verification; and receiving, in response to verification of the second VP, an authentication token for accessing the resource system.

8. The computer-implemented method of claim 7, further comprising:

determining first data representing a hash of the first digital credential;

determining an allowlist representing valid digital credentials, the allowlist including an association between the first public key and the first data; and storing the allowlist in a distributed ledger.

9. The computer-implemented method of claim 1, further comprising:

sending a third request for a second digital credential, the second digital credential corresponding to an attribute;

receiving, in response to the third request, a fourth request for a second biometric-linked cryptographic key;

creating, using the TEE, a second biometric-linked cryptographic key pair including a second private key and a second public key, the TEE conditioning use of the second private key on confirming that a received biometric input matches the first biometric template;

sending the second public key to the trusted issuer system; and receiving the second digital credential from the trusted issuer system, the second digital credential including a claim corresponding to the attribute, the second public key, and a second digital signature of the trusted issuer system.

10. The computer-implemented method of claim 9, further comprising:

determining first data representing a hash of the second digital credential;

determining an allowlist representing valid digital credentials, the allowlist including an association between the second public key and the first data; and storing the allowlist in a distributed ledger such that the allowlist supersedes a previous version of the allowlist.

11. A system, comprising:

at least one processor; and at least one memory comprising instructions that, when executed by the at least one processor, cause the system to:

send, from a user device to a trusted issuer system, a first request for a first digital credential;

receive, in response to the first request, a second request for a first biometric-linked cryptographic key;

create, using a trusted execution environment (TEE) of the user device, a first biometric-linked cryptographic key pair including a first private key and a first public key, the TEE conditioning use of the first private key on confirming that a received biometric input matches a first biometric template;

send the first public key to the trusted issuer system; and receive the first digital credential from the trusted issuer system, the first digital credential including the first public key and a first digital signature of the trusted issuer system.

12. The system of claim 11, wherein the at least one memory further comprises instructions that, when executed by the at least one processor, further cause the system to:

receive a third request to generate a verifiable presentation (VP);

output a first prompt for biometric input;

receive a first biometric input;

determine, using the TEE, that the first biometric input matches the first biometric template; and receive, from the TEE in response to the TEE determining that the first biometric input matches the first biometric template, the VP representing the first digital credential and a second digital signature corresponding to the first private key.

13. The system of claim 11, wherein the at least one memory further comprises instructions that, when executed by the at least one processor, further cause the system to:

receive, from a second device, a request for payment for executing a transaction;

receive a first biometric input;

determine, using the TEE, that the first biometric input matches the first biometric template;

receive, from the TEE in response to the TEE determining that the first biometric input matches the first biometric template, a verifiable presentation (VP) representing the first digital credential and a second digital signature corresponding to the first private key;

send the VP to at least one of the second device or a third device associated with the second device;

receive an indication that the VP has been verified; and in response to receiving the indication, execute the transaction with the second device.

14. The system of claim 11, wherein the at least one memory further comprises instructions that, when executed by the at least one processor, further cause the system to:

create a second cryptographic key pair including a second private key and a second public key, wherein the user device does not condition use of the second private key on confirming that a received biometric input matches the first biometric template;

send the second public key to the trusted issuer system; and receive a second digital credential from the trusted issuer system, the second digital credential including the second public key and a second digital signature of the trusted issuer system.

15. The system of claim 14, wherein the at least one memory further comprises instructions that, when executed by the at least one processor, further cause the system to:

determine that the first private key is unavailable;

send, to the trusted issuer system, a third request for a third digital credential;

receive a fourth request for a first verifiable presentation (VP);
create, using the second private key and the second digital credential, the first VP;
send the first VP to at least one of the trusted issuer system or a verifier system for verification; and
receive, from the trusted issuer system in response to verification of the first VP, the third digital credential.

16. The system of claim 15, wherein the at least one memory further comprises instructions that, when executed by the at least one processor, further cause the system to:
receive, from a second device, a request for payment for executing a transaction;
create, using the third digital credential, a second VP;
submit the second VP for verification;
receive an indication that the second VP has been verified; and
in response to receiving the indication, execute the transaction with the second device.

17. The system of claim 15, wherein the at least one memory further comprises instructions that, when executed by the at least one processor, further cause the system to:
send a request for access to a resource system;
receive a request for a second VP;
create, using the third digital credential, the second VP;
submit the second VP for verification; and
receive, in response to verification of the second VP, an authentication token for accessing the resource system.

18. The system of claim 17, wherein the at least one memory further comprises instructions that, when executed by the at least one processor, further cause the system to:
determine first data representing a hash of the first digital credential;
determine an allowlist representing valid digital credentials, the allowlist including an association between the first public key and the first data; and
store the allowlist in a distributed ledger.

19. The system of claim 11, wherein the at least one memory further comprises instructions that, when executed by the at least one processor, further cause the system to:
send a third request for a second digital credential, the second digital credential corresponding to an attribute;
receive, in response to the third request, a fourth request for a second biometric-linked cryptographic key;
create, using the TEE, a second biometric-linked cryptographic key pair including a second private key and a second public key, the TEE conditioning use of the second private key on confirming that a received biometric input matches the first biometric template;
send the second public key to the trusted issuer system; and
receive the second digital credential from the trusted issuer system, the second digital credential including a claim corresponding to the attribute, the second public key, and a second digital signature of the trusted issuer system.

20. The system of claim 19, wherein the at least one memory further comprises instructions that, when executed by the at least one processor, further cause the system to:
determine first data representing a hash of the second digital credential;
determine an allowlist representing valid digital credentials, the allowlist including an association between the second public key and the first data; and
store the allowlist in a distributed ledger such that the allowlist supersedes a previous version of the allowlist.

* * * * *